(12) United States Patent
Lee et al.

(10) Patent No.: US 11,907,600 B2
(45) Date of Patent: Feb. 20, 2024

(54) FOLDABLE ELECTRONIC DEVICE AND METHOD FOR DISPLAYING INFORMATION IN FOLDABLE ELECTRONIC DEVICE

(71) Applicant: SAMSUNG ELECTRONICS CO., LTD., Suwon-si (KR)

(72) Inventors: Seungeun Lee, Suwon-si (KR); Seonghoon Choi, Suwon-si (KR); Minseok Kang, Suwon-si (KR); Oheon Kwon, Suwon-si (KR); Seungnyun Kim, Suwon-si (KR); Chakyum Kim, Suwon-si (KR); Taihoon Kim, Suwon-si (KR); Yongsang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/105,448

(22) Filed: Feb. 3, 2023

(65) Prior Publication Data
US 2023/0185507 A1 Jun. 15, 2023

Related U.S. Application Data

(63) Continuation of application No. PCT/KR2021/010176, filed on Aug. 3, 2021.

(30) Foreign Application Priority Data

Aug. 4, 2020 (KR) .................. 10-2020-0097296

(51) Int. Cl.
*G06F 3/14* (2006.01)
*G06F 1/16* (2006.01)
(Continued)

(52) U.S. Cl.
CPC .......... *G06F 3/1423* (2013.01); *G06F 1/1641* (2013.01); *G06F 1/1677* (2013.01); *G06F 3/0482* (2013.01); *G06F 3/0484* (2013.01)

(58) Field of Classification Search
CPC .... G06F 1/1677; G06F 1/1423; G06F 3/1423; G06F 1/1641
See application file for complete search history.

(56) References Cited

U.S. PATENT DOCUMENTS 9,386,300 B2  7/2016  Lee et al.
9,864,410 B2  1/2018  La et al.
(Continued)

FOREIGN PATENT DOCUMENTS

CN    111263005     6/2020
EP    2902870 A2    8/2015
(Continued)

OTHER PUBLICATIONS

International Search Report dated Oct. 29, 2021 in PCT application PCT/KR2021/010176, 3 pages.
(Continued)

*Primary Examiner* — Andrea C Leggett
(74) *Attorney, Agent, or Firm* — Nixon & Vanderhye P.C.

(57) ABSTRACT

A fordable electronic device may include a first display, a second display, and a processor. The processor is configured to: based on the electronic device being in a folded state and a screen being displayed through the second display, detect that unfolding of the electronic device has started; based on and angle exceeding a first angle, control the second display to be in an off state and display at least a portion of a screen displayed through the second display on a first area of the first display and a menu for controlling the screen displayed through the first area on a second area of the first display; and based on the angle exceeding a second angle greater
(Continued)

than the first angle, display at least a portion of the screen displayed through the first area and the second area on the entire area of the first display.

20 Claims, 25 Drawing Sheets

(51) Int. Cl.
*G06F 3/0482* (2013.01)
*G06F 3/0484* (2022.01)

(56) References Cited

U.S. PATENT DOCUMENTS

| | | | |
|---|---|---|---|
| 10,504,488 B2 | 12/2019 | Chun et al. | |
| 11,228,669 B2 | 1/2022 | Jang et al. | |
| 2012/0084694 A1* | 4/2012 | Sirpal | G06F 3/04812 |
| | | | 715/769 |
| 2014/0218321 A1 | 8/2014 | Lee et al. | |
| 2015/0097755 A1* | 4/2015 | Kim | G06F 3/1446 |
| | | | 345/1.3 |
| 2015/0221065 A1 | 8/2015 | Kim et al. | |
| 2016/0179236 A1* | 6/2016 | Shin | H04M 1/0216 |
| | | | 345/173 |
| 2016/0381014 A1 | 12/2016 | Kim | |
| 2017/0131118 A1 | 5/2017 | Kauhaniemi et al. | |
| 2017/0171939 A1 | 6/2017 | Yang et al. | |
| 2017/0229100 A1* | 8/2017 | Chun | G09G 5/38 |
| 2017/0322597 A1 | 11/2017 | Lee et al. | |
| 2020/0128116 A1 | 4/2020 | Jang et al. | |
| 2020/0170127 A1 | 5/2020 | Kim | |
| 2020/0225706 A1 | 7/2020 | Jung et al. | |
| 2021/0174766 A1 | 6/2021 | Chung et al. | |

FOREIGN PATENT DOCUMENTS

| | | |
|---|---|---|
| KR | 10-2017-0069775 | 6/2017 |
| KR | 10-1942950 | 1/2019 |
| KR | 10-2020-0022574 | 3/2020 |
| KR | 10-2020-0037761 | 4/2020 |
| KR | 10-2020-0043578 | 4/2020 |
| KR | 10-2020-0061262 | 6/2020 |
| KR | 10-2020-0077947 | 7/2020 |
| KR | 10-2020-0086830 | 7/2020 |

OTHER PUBLICATIONS

Written Opinion dated Oct. 29, 2021 in PCT application PCT/KR2021/010176, 4 pages.
Extended European Search Report dated Dec. 4, 2023 for EP Application No. 21854153.0.

* cited by examiner

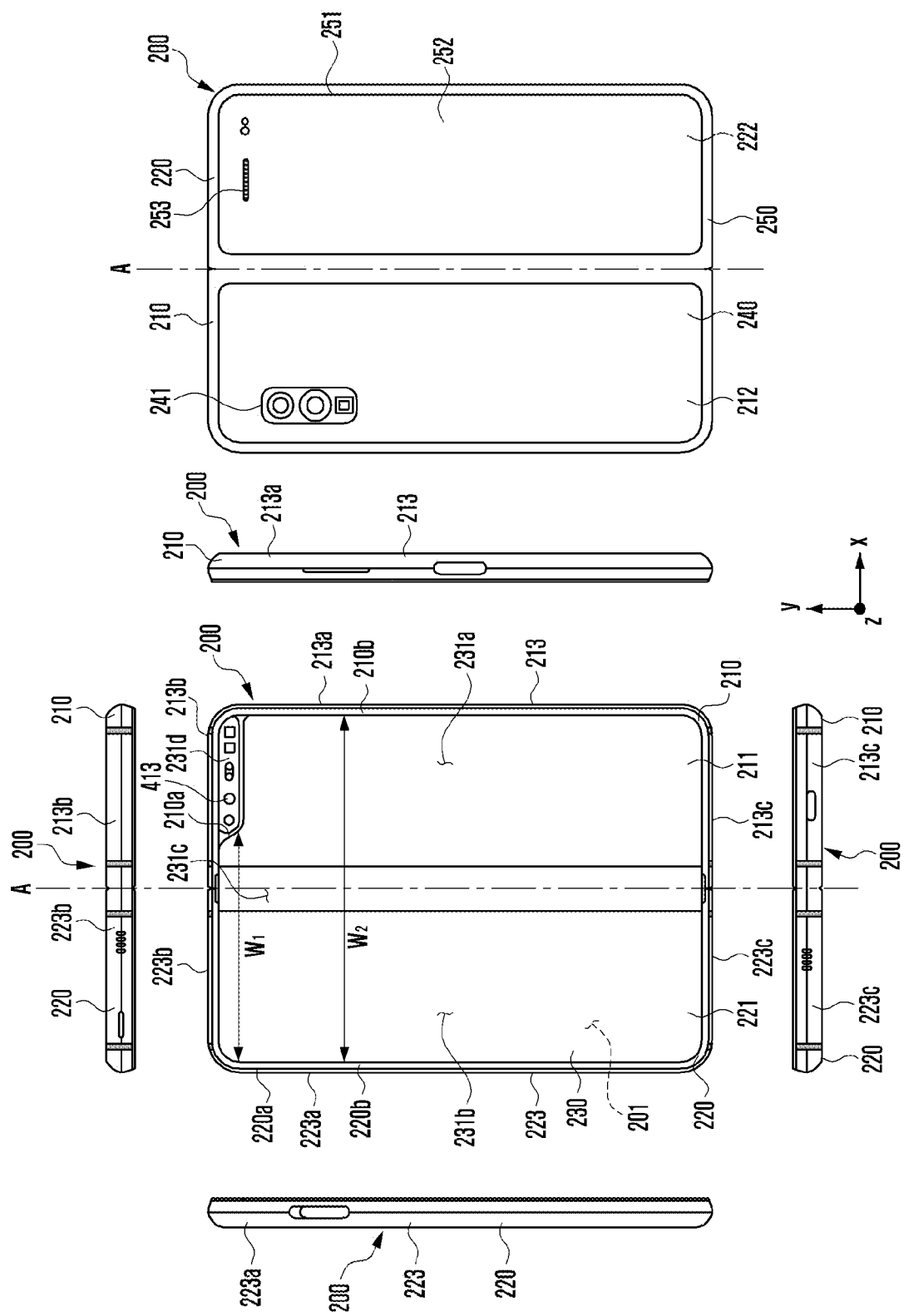

FIG. 4A
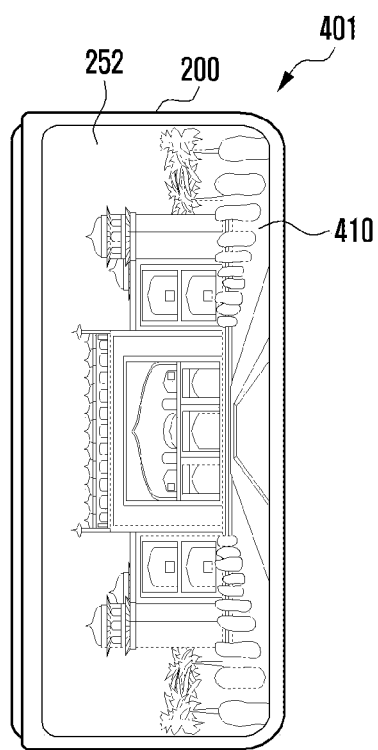
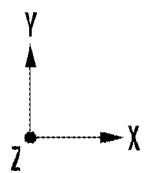

FOLDABLE ELECTRONIC DEVICE AND METHOD FOR DISPLAYING INFORMATION IN FOLDABLE ELECTRONIC DEVICE

CROSS-REFERENCE TO RELATED APPLICATIONS

This application is a continuation of International Application No. PCT/KR2021/010176 designating the United States, filed on Aug. 3, 2021, in the Korean Intellectual Property Receiving Office and claiming priority to Korean Patent Application No. 10-2020-0097296, filed on Aug. 4, 2020, in the Korean Intellectual Property Office, the disclosures of which are incorporated by reference herein in their entireties.

BACKGROUND

Field

The disclosure relates to a foldable electronic device and a method for displaying information in a foldable electronic device.

Description of Related Art

Recently, research and development on a foldable electronic device, a housing of which may be a folded or an unfolded around a hinge structure, have been actively conducted. A foldable electronic device may increase the display area of a display thereof in an unfolded state and have a reduced volume in a folded state, and thus can improve user convenience.

An in-folding type foldable electronic device may have a main display positioned on one surface of a first housing and one surface of a second housing which face each other in a folded state.

The in-folding type foldable electronic device may further include a sub-display positioned on the other surface opposite to the one surface of the second housing. The sub-display may be visible to the outside even in the state where the in-folding type foldable electronic device is folded, and thus various user interfaces and/or user experiences may be provided using the sub-display for user convenience.

SUMMARY

Embodiments of the disclosure provide a foldable electronic device configured such that a drive state of a main display and a drive state of a sub-display is dynamically adjusted according to an angle between a first housing and a second housing and whether the foldable electronic device is being folded or unfolded, thereby providing a more convenient experience to a user.

An electronic device according to various example embodiments may include: a first housing including a first surface oriented in a first direction and a second surface oriented in a second direction opposite to the first direction; a second housing including a third surface oriented in a third direction and a fourth surface oriented in a fourth direction opposite to the third direction; a hinge disposed between the first housing and the second housing; a first display positioned on the first surface and the third surface; a second display positioned on the fourth surface; a sensor module, comprising at least one sensor, configured to detect an angle between the first housing and the second housing; and a processor operatively connected to the first display, the second display, and the sensor module, wherein the processor may be configured to: detect that unfolding of the electronic device starts based on the electronic device being in a folded state and a screen being displayed through the second display; control the second display to an off-state; control the first display to display at least a part of a screen displayed through the second display through a first area of the first display positioned on the first surface, and to display a menu for controlling a screen displayed through the first area through a second area of the first display positioned on the third surface, based on the angle exceeding a second unfolding threshold angle; and control the first display to display at least a part of a screen displayed through the first area and the second area through the entire area of the first display based on the angle exceeding a third unfolding threshold angle, wherein the third unfolding threshold angle may be greater than the second unfolding threshold angle.

A method for driving an electronic device according to various example embodiments, the electronic device including: a first housing including a first surface oriented in a first direction and a second surface oriented in a second direction opposite to the first direction; a second housing including a third surface oriented in a third direction and a fourth surface oriented in a fourth direction opposite to the third direction; a hinge coupled to the first housing and the second housing and to which at least one of the first housing and the second housing is rotatably connected; a first display positioned on the first surface and the third surface; and a second display positioned on the fourth surface, the method may include: detecting that unfolding of the electronic device based on the electronic device being in a folded state and a screen being displayed through the second display; detecting an angle between the first housing and the second housing; controlling the second display to an off-state; displaying at least a part of a screen displayed through the second display through a first area of the first display positioned on the first surface; displaying a menu for controlling a screen displayed through the first area through a second area of the first display positioned on the third surface, based on the angle exceeding a second unfolding threshold angle; and displaying at least a part of a screen displayed through the first area and the second area through the entire area of the first display, based on the angle exceeding a third unfolding threshold angle, wherein the third unfolding threshold angle may be greater than the second unfolding threshold angle.

In an electronic device according to various example embodiments of the disclosure, a drive state of a main display and a drive state of a sub-display may be dynamically adjusted according to an angle between a first housing and a second housing and whether the electronic device is being folded or unfolded, to provide a more convenient experience to a user.

In addition, various effects directly or indirectly identified through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 2A is a diagram illustrating an unfolded state of a foldable electronic device according to various embodiments;

FIG. 4A is a diagram illustrating an example "cover display state" of a display in case an electronic device is in a folded state according to various embodiments;

DETAILED DESCRIPTION

Figure 1:
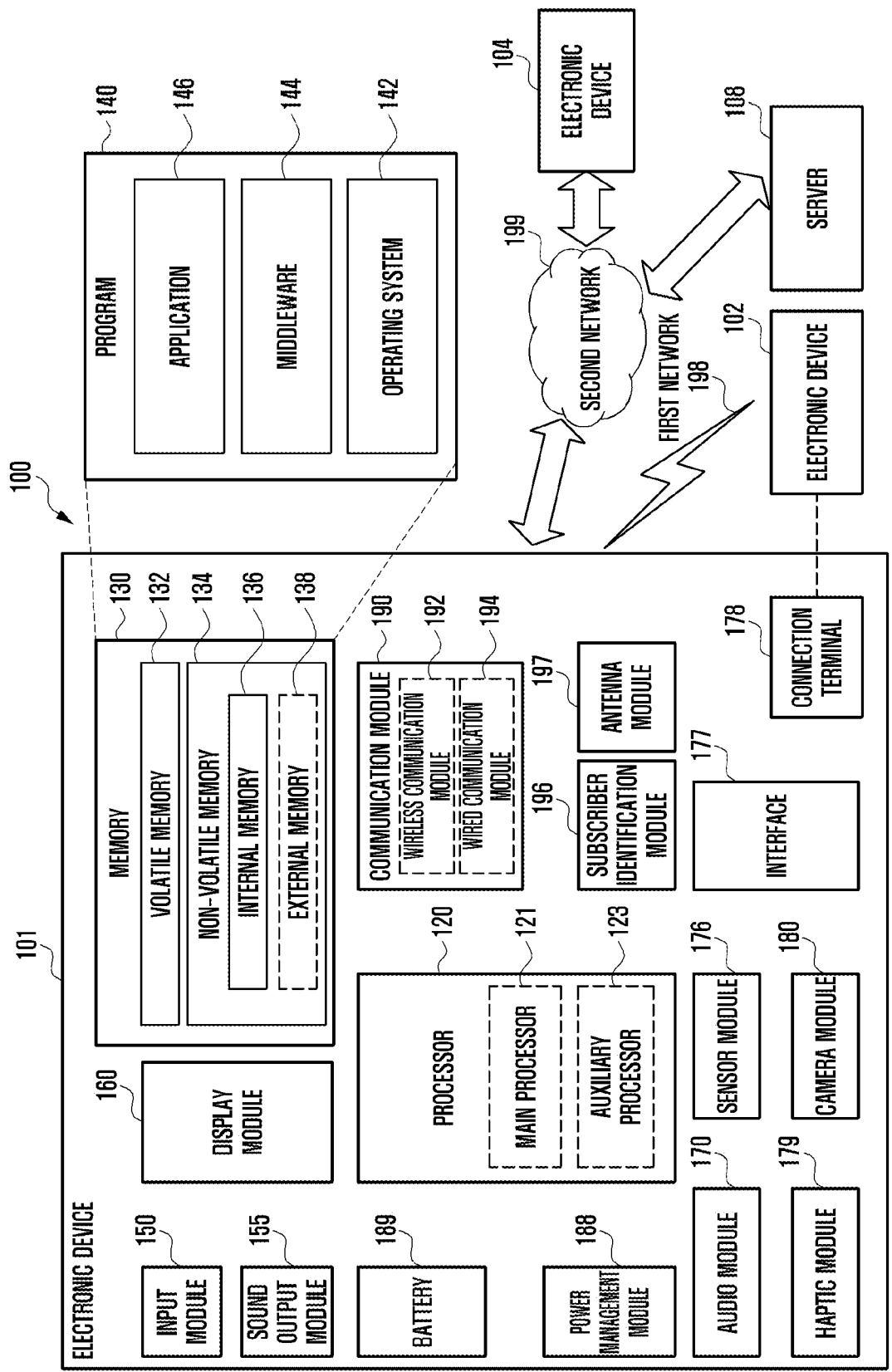
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit, a neural processing unit (NPU), an image signal processor, a sensor hub processor, or a communication processor) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (TMST)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with/to" or "connected with/to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2B:
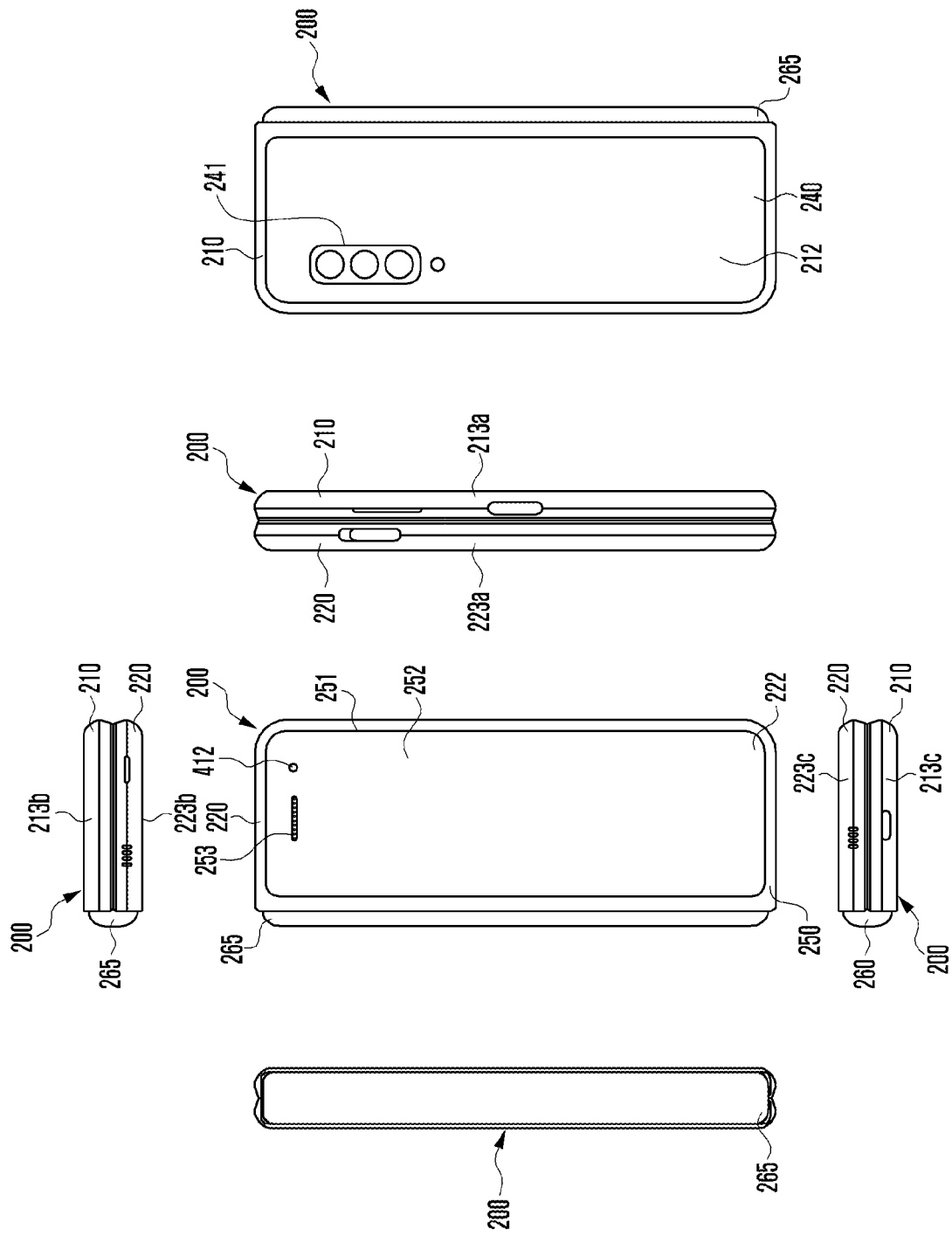
FIG. 2B is a diagram illustrating a folded state of the foldable electronic device in FIG. 2A according to various embodiments.

FIG. 2A is a diagram illustrating an unfolded state of a foldable electronic device according to various embodiments. FIG. 2B is a diagram illustrating a folded state of the foldable electronic device in FIG. 2A according to various embodiments.

Referring to FIG. 2A, an electronic device 200 (e.g., the electronic device 101 in FIG. 1) may include a first housing 210 and a second housing 220 including at least one space in which at least one display may be disposed, at least one display 230 (e.g., a flexible display, a foldable display, or a first display) disposed in the at least one space, a second display 252 (e.g., a sub-display) disposed on one surface of the second housing 220, a hinge (not shown) configured to allow the first housing 210 and the second housing 220 to be folded with respect to each other, and a hinge cover (e.g., the hinge cover 265 in FIG. 2B) for covering a foldable portion between the first housing 210 and the second housing 220. In the disclosure, a surface, on which the first display 230 is disposed, may refer, for example, to the front surface of the electronic device 200, and a surface opposite to the front surface may refer, for example, to the rear surface of the electronic device 200. In addition, a surface, which surrounds a space between the front surface and the rear surface, may refer, for example, to the side surface of the electronic device 200.

In an embodiment, the one pair of housings 210 and 220 may include a first housing 210 including a sensor area 231d, a second housing 220, a first rear cover 240, and a second rear cover 250. The pair of housings 210 and 220 of the electronic device 200 are not limited to the shape and the combination as illustrated in FIG. 2A and FIG. 2B, and may be implemented by other shapes or a combination and/or coupling of components. For example, in an embodiment, the first housing 210 and the first rear cover 240 may be integrally formed, and the second housing 220 and the second rear cover 250 may be integrally formed.

According to an embodiment, the first housing 210 and the second housing 220 may be formed as a single housing (not shown), a portion folded in the single housing may be formed of a flexible material (not shown), and a hinge may not be separately provided and be replaced with a flexible material. According to an embodiment, the first housing 210 and the second housing 220 may be arranged at both sides around a folding axis (the axis A), and may be folded or unfolded around the folding axis (the axis A).

According to an embodiment, the first housing 210 and the second housing 220 may be arranged at both sides around a folding axis (e.g., the axis A) defined by a hinge, and the folding axis may be disposed to be parallel to the lengthwise direction of a first display. For example, the first display may have a shape having a long length in the y-axis direction, and the folding axis may cross the first display in the y-axis direction.

According to an embodiment, the first housing 210 and the second housing 220 may have different angles formed by each other or different distances from each other according to whether a state of the electronic device 200 is in an unfolded state (a flat stage, an unfolding state, or a closing state), a folded state (a folding state), or an intermediate state where the electronic device switches from an unfolded state to a folded state or from a folded state to an unfolded state. At least a partial area of the first housing 210 or the second housing 220 may include a sensor area 231d in which various sensors are arranged. In an embodiment, the sensor arrangement area 231d may be additionally provided in at least a partial area of the second housing 220 and or may be replaced.

According to an embodiment, an angle formed by the first housing 210 and the second housing 220 may be adjusted by a hinge (not shown). According to an embodiment, in case the first housing 210 and the second housing 220 are oriented in the same direction (e.g., the front surface) or are substantially parallel to the same axis (the x-axis), it may be referred to as an unfolded state of the electronic device 200. According to an embodiment, the electronic device 200 may have the first display 230 disposed in the space formed by the first housing 210 and the second housing 220, and the first display 230 may be positioned on a first surface 211 and a third surface 221. The first display 230 may include a first area 231a positioned on the first surface 211 of the first housing 210, a second area 231b positioned on the third surface 221 of the second housing 220, and a folding area 231c positioned to correspond to the hinge. According to an embodiment, the first display 230 of which at least a partial area is bendable may have an area bendable in various shapes in addition to the first surface 211 and third surface 221, and the bendable area may not be limited to one area. According to various embodiments, the hinge may be disposed in an area in which the first display 230 is bendable, and may support such that the first display 230 maintains a predetermined angle in a state of being bent in case the first display 230 is bent.

According to an embodiment, the first housing 210 may include the first surface 211 disposed to face the front surface thereof, a second surface 212 oriented in a direction opposite to the first surface 211, and a first lateral member 213 surrounding at least a part of a space between the first surface 211 and the second surface 212. In an embodiment, the first lateral member 213 may include a first side surface 213a disposed parallel to a folding axis (the axis A), a second side surface 213b extending from one end of the first side surface 213a in a direction perpendicular to the folding axis, and a third side surface 213c extending from the other end of the first side surface 213a in a direction perpendicular to the folding axis (the axis A).

In an embodiment, at least a part of the second housing 220 may be connected to a hinge, and the second housing 220 may include a third surface 221 disposed to face the front surface of the electronic device 200, a fourth surface 222 oriented in a direction opposite to the third surface 221, and a second lateral member 220 surrounding at least a part of a space between the third surface 221 and the fourth surface 222. In an embodiment, the second lateral member 220 may include a fourth side surface 223a disposed parallel to a folding axis (the axis A), a fifth side surface 223b extending from one end of the fourth side surface 223a in a direction perpendicular to the folding axis (the axis A), and a sixth side surface 223c extending from the other end of the fourth side surface 223a in a direction perpendicular to the folding axis (the axis A). In an embodiment, the third surface 221 may be configured to face the first surface 211 in a folded state.

In an embodiment, the electronic device 200 may include a recess 201 formed through a structural shape coupling between the first housing 210 and the second housing 220 so as to accommodate the first display 230 of which at least a part is bendable. According to an embodiment, the recess 201 may have substantially the same size as the first display 230. In an embodiment, due to the sensor area 231d, the recess 201 may have two widths different from each other in a direction perpendicular to a folding axis (the axis A). For example, the recess 201 may have a first width W1 between a first portion 220a of the second housing 220 and a first portion 210a of the first housing 210, which is formed at the edge of the sensor area 231d, and may have a second width W2 formed by a second portion 210b which is parallel to the folding axis (the axis A) and is other than a second portion 220b of the second housing 210, and the sensor area 213d of the first housing 210. According to various embodiments, the widths of the recess 201 may not be limited to the illustrated example. According to various embodiments, the recess 201 may have two or more widths different from each other, or may have the same width.

In an embodiment, at least a part of the first housing 210 and the second housing 220 may be formed of a metal material or non-metal material having the rigidity of a size selected for supporting the first display 230.

In an embodiment, the sensor area 231d may be formed to have a predetermined area adjacent to one side corner of the first housing 210. However, the arrangement, shape, or size of the sensor area 231d may not be limited to the illustrated example. According to various embodiments, at least one of a front camera device, a receiver, a proximity sensor, an ultrasonic sensor, a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or indicator may be disposed in at least a partial area of the sensor area 231d. In various embodiments, the components may be arranged inside the electronic device without a separate sensor area 231d. For example, at least a part of the components may be disposed under the first display 230 or may be exposed or visible (as used herein, the terms "exposed" and visible may be used interchangeably and include a display having a cover layer or cover window, or the like) through a partial area of the first display 230.

In an embodiment, the first rear cover 240 may be disposed on the second surface 212 of the first housing 210 and may have a substantially rectangular edge (periphery). In an embodiment, at least a part of the edge may be surrounded by the first housing 210. Similarly thereto, the second rear cover 250 may be disposed on the fourth surface 222 of the second housing 220, and at least a part of the edge thereof may be surrounded by the second housing 220.

In the illustrated embodiment, the first rear cover 240 and the second rear cover 250 may have a substantially symmetrical shape with reference to a folding axis (the axis A).

As an embodiment, the first rear cover 240 and the second rear cover 250 may include various shapes different from each other. As an embodiment, the first rear cover 240 may be integrally formed with the first housing 210, and the second rear cover 250 may be integrally formed with the second housing 220.

In a non-illustrated embodiment, the first housing 210 and the second housing 220 may not have a symmetrical shape. For example, one of the first housing 210 or the second housing 220 may have a larger shape than the other. Correspondingly thereto, the first rear cover 240 and the second rear cover 250 may also have different shapes.

In an embodiment, the first rear cover 240, the second rear cover 250, the first housing 210, and the second housing 220 may provide a space, in which various components (e.g., a printed circuit board, an antenna module, a sensor module, or a battery) may be arranged, through a structure of being coupled to one another. In an embodiment, one or more components may be arranged or may be visually exposed (e.g., visible) on the rear surface of the electronic device 200. For example, one or more components or sensors such as a camera module 241 (e.g., the camera module 180 in FIG. 1) may be visually exposed (e.g., visible) on the rear surface of the electronic device 200. In various embodiments, the sensors may include a proximity sensor, a rear camera device, and/or a flash. In an embodiment, at least a part of the sub-display 252 (e.g., a second display) may be visually exposed (e.g., visible) through a second rear area 251 of the second rear cover 250. In an embodiment, the electronic device 200 may include a speaker module 253 disposed through at least a partial area of the second rear cover 250.

The first display 230 may be disposed in a space formed by the first housing 210 and the second housing 220. For example, the first display 230 may be seated in the recess 201 formed by the first housing 210 and the second housing 220, and may be disposed to substantially occupy the majority of the front surface of the electronic device 200. Accordingly, the front surface of the electronic device 200 may include the first display 230, a partial area (e.g., an edge area) of the first housing 210, and a partial area (e.g., an edge area) of the second housing 220, the partial areas being adjacent to the first display 230. In an embodiment, the rear surface of the electronic device 200 may include the first rear cover 240, a partial area (e.g., an edge area) of the first housing 210, which is adjacent to the first rear cover 240, the second rear cover 250, and a partial area (e.g., an edge area) of the second housing 220, which is adjacent to the second rear cover 250.

In an embodiment, the first display 230 may refer, for example, to a display of which at least a partial area may be transformed into a flat surface or curved surface. In an embodiment, the first display 230 may include a folding area 231c, a first area 231a disposed at one side (e.g., the right area of the folding area 231c) with reference to the folding area 231c, and a second area 231b disposed at the other side (e.g., the left area of the folding area 231c) thereof. For example, the first area 231a may be disposed on the first surface 211 of the first housing 210, and the second area 231b may be disposed on the third surface 221 of the second housing 220. In an embodiment, the division of an area of the first display 230 may simply be an example, and an area of the first display 230 may be divided into multiple (e.g., four or more, or two) areas according to a structure or a function thereof. As an example, in the embodiment illustrated in FIG. 2A, an area of the first display 230 may be divided by the folding area 231c extending parallel to the y-axis or a folding axis (the axis A). However, in an embodiment, an area of the display 230 may be divided with reference to another folding area (e.g., a folding area parallel to the x-axis) or another folding axis (e.g., a folding axis parallel to the x-axis). The division of an area of the display described above may be merely a physical division by the one pair of housings 210 and 220 and a hinge, and substantially, the first display 230 may be displayed as one entire screen through the one pair of housings 210 and 220 and a hinge. In an embodiment, differently from the second area 231b, the first area 231a may include a notch area which is cut according to the presence of the sensor area 231d. In an embodiment, the first area 231a and the second area 231b may include portions having shapes symmetric to each other and portions having shapes asymmetric to each other.

Referring to FIG. 2B, a hinge cover 265 may be disposed between the first housing 210 and the second housing 220 and may be configured to cover internal components. In an embodiment, the hinge cover 265 may be covered by a part of the first housing 210 and the second housing 220 or exposed to the outside, according to an operation state (e.g., an unfolded state (a flat state or a first designated state) or a folded state (a second designated state)) of the electronic device 200.

Hereinafter, an operation of the first housing 210 and the second housing 220 and each area of the first display 230 according to an operation state (e.g., an unfolded state (a flat state) and a folded state) of the electronic device 200 will be described.

In an embodiment, in case the electronic device 200 is in an unfolded state (a flat state) (e.g., the state in FIG. 5A), the first housing 210 and the second housing 220 may form a substantially horizontal angle (e.g., 180 degrees). In an unfolded state (e.g., a first designated state), a first area (e.g., 231a in FIG. 2A) and a second area (e.g., 231b in FIG. 2A) of a display may be arranged to be oriented in substantially the same direction. In addition, in case the electronic device is in an unfolded state, a folding area (e.g., 231c in FIG. 2A) may form the same plane as the first area 231a and the second area 231b.

In an embodiment, in case the electronic device 200 is an intermediate state (e.g., the state in FIG. 5B or a second designated state), the first housing 210 and the second housing 220 may be disposed to form a predetermined angle (e.g., between about 10 degrees and 170 degrees) with each other. The first area (e.g., 231a in FIG. 2A) and the second area (e.g., 231b in FIG. 2A) of the first display 230 may form an angle larger than that of a folded state and smaller than that of an unfolded state. At least a part of a folding area (e.g., 231c in FIG. 2A) may be formed as a curved-surface having a predetermined curvature, and at this time, the curvature may be smaller than that of a folded state.

In an embodiment, in case the electronic device 200 is a folded state (e.g., the state in FIG. 5C or a third designated state), the first housing 210 and the second housing 220 may be arranged to face each other. For example, a first surface of the first housing 210 and a third surface of the second housing 220 may be arranged to face each other. The first area (e.g., 231a in FIG. 2A) and the second area (e.g., 231b in FIG. 2A) of the first display 230 may form an acute angle (e.g., between 0 degrees and 10 degrees) and may be arranged to face each other. The folding area (e.g., 231c in FIG. 2A) may be formed as a curved-surface of which at least a part has a predetermined curvature.

As an embodiment, the electronic device 200 may be an out-folding type foldable electronic device. For example, in case the out-folding type electronic device 200 is in a folded state (a flat state), the first housing 210 and the second housing 220 may be configured such that the second housing 220 rotates with reference to the first housing 210, and thus the second surface 212 and the fourth surface 222 may be reversely folded to face each other.

Figure 3:
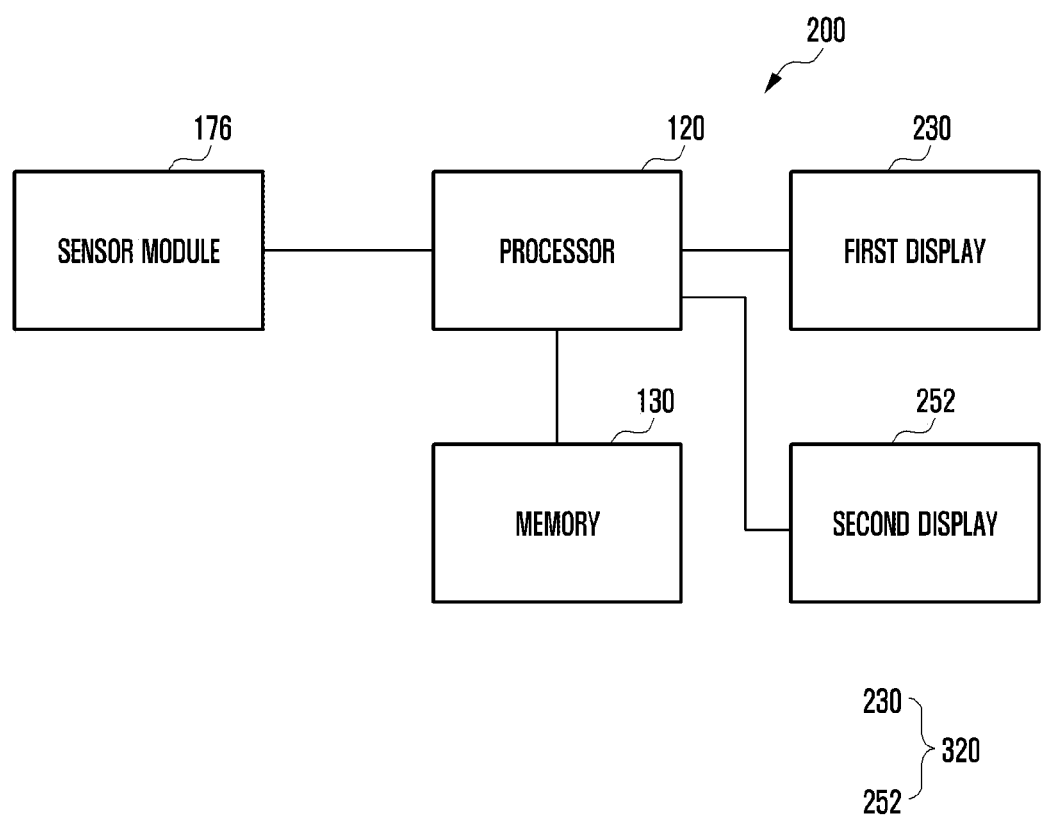
FIG. 3 is a block diagram illustrating an example configuration of an electronic device according to various embodiments.

FIG. 3 is a block diagram illustrating an example configuration of an electronic device 200 according to various embodiments.

The electronic device 200 as illustrated in FIG. 3 may be at least partially similar to the electronic device 101 as illustrated in FIG. 1 or the electronic device 200 as illustrated in FIG. 2A and FIG. 2B, or may include various embodiments.

Hereinafter, in conjunction with FIG. 3, features of the electronic device 200, which are not described in or differ from FIG. 1 or FIG. 2A and FIG. 2B, will be described.

Referring to FIG. 3, an electronic device (e.g., the electronic device 200 in FIG. 2A) according to an embodiment may include a display 320 (e.g., the display module 160 in FIG. 1), a sensor module (e.g., including at least one sensor) 176 (e.g., the sensor module 176 in FIG. 1), a memory 340 (e.g., the memory 130 in FIG. 1), and/or a processor (e.g., including processing circuitry) 120 (e.g., the processor 120 in FIG. 1).

According to an embodiment, the display 320 may include the first display 230 (e.g., the display 230 in FIG. 2A and FIG. 2B) visible through the front surface of the electronic device 200 or the second display 252 (e.g., the second display 252 in FIG. 2A and FIG. 2B) visible through a portion of the rear surface (e.g., the fourth surface 222 in FIG. 2A) of the electronic device 200. According to an embodiment, the first display 230 may be a flexible display which extends from the first surface 211 to the third surface 221 and of which at least a part is folded. According to an embodiment, the second display 252 may be visible through at least a portion of a fourth surface (the fourth surface 222 in FIG. 2A).

According to an embodiment, the sensor module 176 may include at least one sensor and detect a folding state (e.g., an angle between the first housing 210 and the second housing 220) of the electronic device 200. For example, the sensor module 176 may include a motion sensor or an angle sensor (e.g., an acceleration sensor) for detecting an angle between the first housing 210 and the second housing 220. According to an embodiment, the sensor module 176 may include a first acceleration sensor disposed in the first housing and a second acceleration sensor disposed in the second housing. The electronic device 200 may be configured to obtain first information on a direction in which the first housing 210 is placed through a first acceleration sensor (not shown), obtain second information on a direction in which the second housing 220 is positioned through a second acceleration sensor (not shown), and calculate a direction in which the electronic device 200 is placed and/or an angle (e.g., the angle K in FIG. 4B) between the first housing 210 and the second housing 220, based on the first information and the second information.

According to various embodiments, the sensor module 176 may further include at least one of a hall sensor, a proximity sensor, an infrared (IR) sensor, or an illuminance sensor for measuring the distance between the first surface 211 and third surface 221.

According to an embodiment, the sensor module 176 may deliver, to the processor 120, the sensing data obtained through a first acceleration sensor disposed in the first housing 210 and a second acceleration sensor disposed in the second housing 220. The processor 120 may identify or calculate a position of the first housing 210, a position of the second housing 220, and/or an angle between the first housing 210 and the second housing 220, based on the sensing data received from the sensor module 176. For example, the processor 120 may identify positions and directions of the first housing 210 and the second housing 220, based on the amount of change and a relative difference in the sensing data obtained from the first acceleration sensor and the second acceleration sensor.

According to an embodiment, the memory 130 may store multiple predetermined (e.g., specified) values (e.g., a resolution or a display size) for controlling the display 320, based on a folding state of the first housing 210 and the second housing 220. For example, the memory 130 may store instructions for operating the processor 120 according to an angle range formed by the first housing 210 and the second housing 220.

According to an embodiment, the processor 120 may include various processing circuitry and control the overall operation of the electronic device 200. According to various embodiments, the processor 120 may control a display driving IC (DDI) in order to control the first display 230 and the second display 252. For example, the DDI may independently control the first display 230 and the second display 252.

In the disclosure, an on-state of the display 320 may refer, for example, to a state where the electronic device 200 (or the processor 120 of the electronic device 200) drives the entire display area of the display 320. For example, the electronic device 200 may control the display 320 such that a designated picture or a designated image, and/or an execution screen of an application is displayed on the entire display area of the display 320 while the display 320 is in an on-state.

In the disclosure, an off-state of the display 320 may refer, for example, to a state where the electronic device 200 (or the processor 120 of the electronic device 200) does not drive the display 320. For example, the electronic device 200 may not drive the entire display area of the display 320 while the display 320 is in an off-state.

In the disclosure, a "standby state (or a lock state)" of the display 320 may refer, for example, to a state where the electronic device 200 (or the processor 120 of the electronic device 200) drives only at least a part of a display area of the display 320 and does not drive the remaining display areas except for the at least a part. For example, the electronic device 200 may display designated information through only the at least a partial area and may not drive the remaining display areas except for the at least a partial area while the display 320 is in a standby state. For example, the designated information may include at least a part of a date, time, a calendar, a designated image, and/or a notification icon.

Figure 4B:
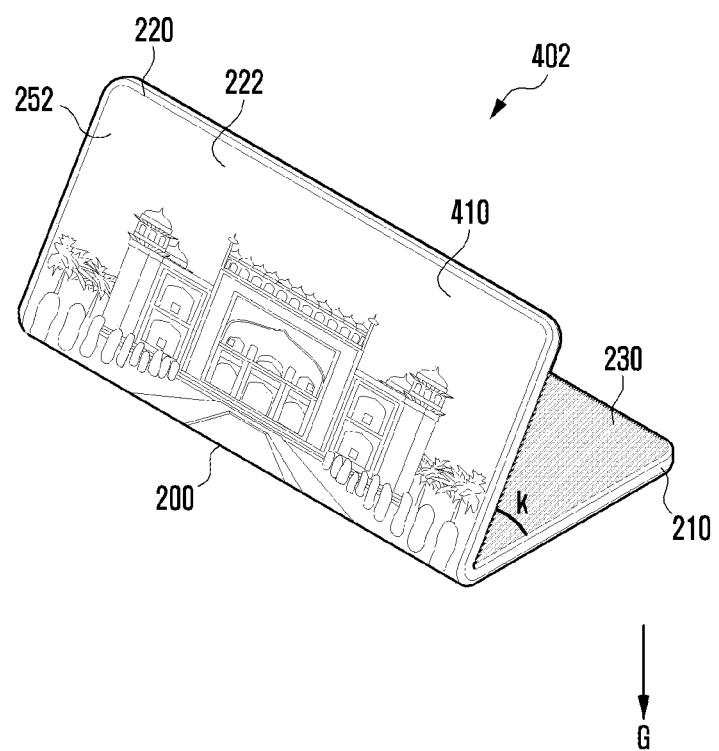
FIG. 4B is a diagram illustrating an example "cover display state" of a display in case an electronic device is in an intermediate state according to various embodiments.
Figure 4C:
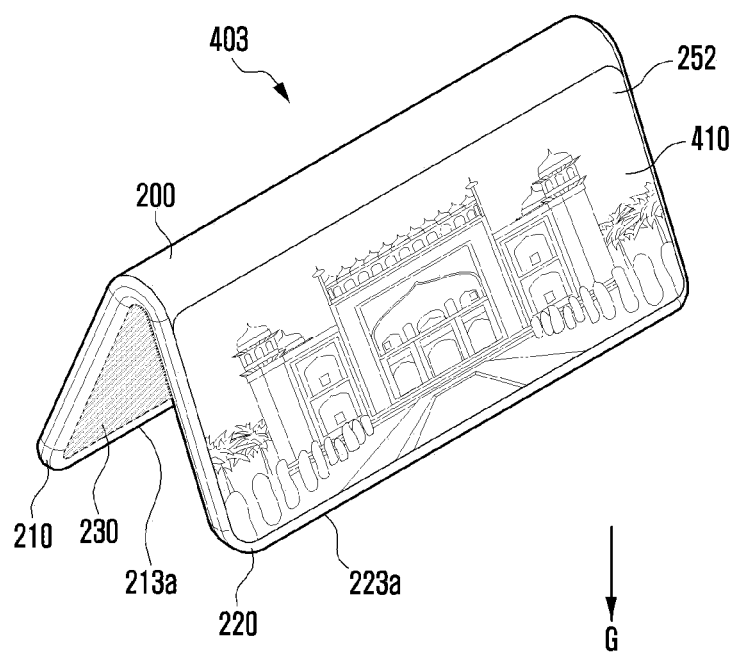
FIG. 4C is a diagram illustrating an example "cover display state" of a display in case an electronic device is in an intermediate state according to various embodiments.

FIGS. 4A, 4B and FIG. 4C are diagrams illustrating example "cover display states" of a display 320 according to various embodiments.

In the disclosure, a "cover display state" of the electronic device 200 may refer, for example, to a state where the electronic device 200 controls the first display 230 to an off-state, controls the second display 252 to an on-state, and controls such that an execution screen (e.g., the execution screen 410 in FIG. 4A to FIG. 4C) of an application is displayed on the second display 252. The term and expression "a cover display state" used in the disclosure may be changed to and replaced with terms such as a cover display mode, a cover screen state, and/or a cover screen mode.

Referring to FIGS. 4A, 4B and FIG. 4C, the electronic device 200 according to various embodiments of the disclosure may control the display 320 to a "cover display state".

Referring to FIG. 4A, in case the electronic device 200 is in a folded state, a display (e.g., the display 320 in FIG. 3) may be a state 401 operating in a cover display state.

Referring to FIG. 4B, in case the electronic device 200 is in an intermediate state and a surface (e.g., the second surface 212 or the fourth surface 222 in FIG. 2A) of the first housing 210 or the second housing 220 is placed in the direction of gravity G, the display 320 may be in a state 402 operating in a cover display state.

Referring to FIG. 4C, in case the electronic device 200 is an intermediate state and in case of a state where a side surface (e.g., the first side surface 213*a* in FIG. 2A) of the first housing 210 and a side surface (e.g., the fourth side surface 223*a* in FIG. 2A) of the second housing 220 are placed on a floor (in case of being actually placed in the direction of gravity G), the display 320 may be in a state 403 operating in a cover display state.

In the disclosure, the state, in which the electronic device 200 according to an embodiment is placed as illustrated in FIG. 4C, may refer, for example, to "a state in which the electronic device is placed in a tent shape". For example, as illustrated in FIG. 4C, that the electronic device 200 is placed in a tent shape may refer, for example, to a state where the electronic device 200 is an intermediate state, and a side surface (e.g., the first side surface 213*a* in FIG. 2A) of the first housing 210 and a side surface (e.g., the fourth side surface 223*a* in FIG. 2A) of the second housing 220 are placed on a floor. That the electronic device 200 is placed in a tent shape may refer, for example, to a state where a part of a side surface (e.g., the first side surface 213*a* in FIG. 2A) of the first housing 210 and a part of a side surface (e.g., the fourth side surface 223*a* in FIG. 2A) of the second housing 220 are placed to be oriented in the direction of gravity G.

Figure 5:
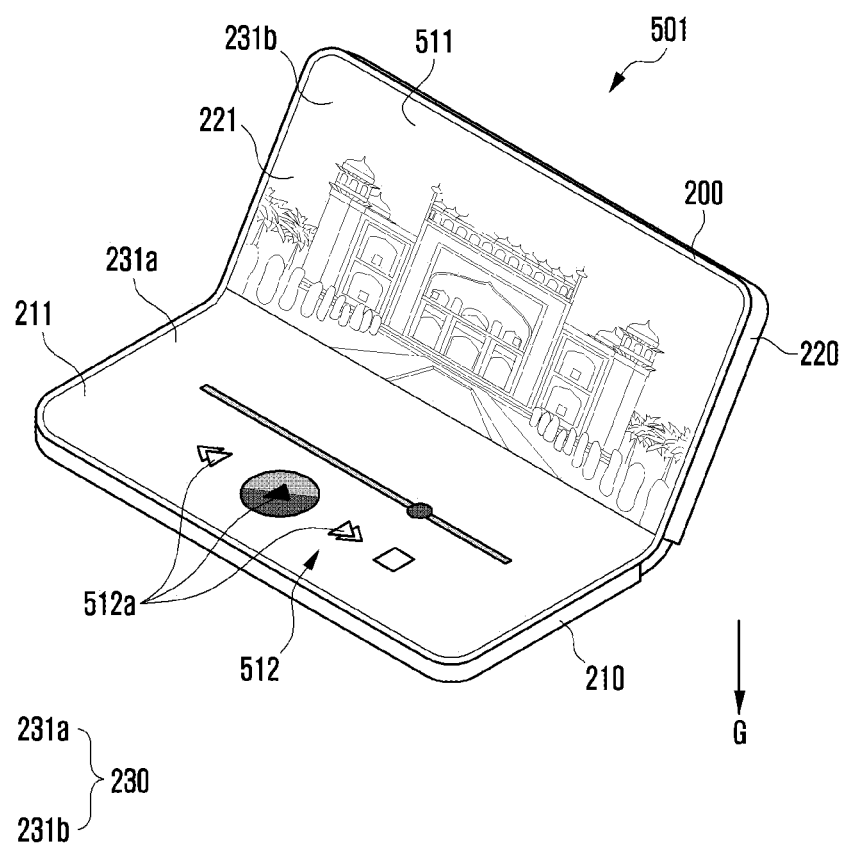
FIG. 5 is a diagram illustrating that a display operates in a flex state in case an electronic device is in an intermediate state according to various embodiments.

FIG. 5 is a perspective view illustrating an example in which a display 230 operates in a flex state in case an electronic device 200 is in an intermediate state according to various embodiments.

In the disclosure, a "flex state" of the electronic device 200 may refer, for example, to a state where the electronic device 200 controls the second display 252 to an off-state, controls the first display 230 to an on-state, and controls such that an execution screen of an application is displayed on a first surface of the first display 230 and at least one menu or control icon for controlling the execution screen is displayed on a second surface of the first display 230. The term and expression "a flex state" used in the disclosure may be changed to and replaced with a term a flex mode or the like.

Referring to FIG. 5, the electronic device 200 may be in an intermediate state, and may be in a state 501 in which the display 230 operates in a flex state.

In a flex state of the display 230, the electronic device 200 may switch the second display 252 to an off-state (or a standby state), and may switch the first display 230 to an on-state.

In a flex state of the display 230, the electronic device 200 may control to detect a direction in which the electronic device 200 is placed, and may control such that the entirety or at least a part of a screen displayed on the second display 252 in a cover display state is displayed in the first area 231*a* or the second area 231*b* of the first display 230 according to a direction in which the electronic device 200 is placed.

For example, a flex state of the display 230 may be driven in a state where the first housing 210 is placed on a floor surface and the second housing 220 forms a specific angle with respect to the first housing 210. In this case, the second surface 212 of the first housing 210 may be placed to be oriented in the direction of gravity G. In case the first housing 210 is placed on a floor surface and the second housing 220 forms a specific angle with respect to first housing 210, the electronic device 200 may display the entirety or at least a part of a screen (e.g., the execution screen 410 in FIG. 4A to FIG. 4C) associated with an application which is being executed through the second area 231*b* of the first display 230 positioned in the second housing 220, and may display a control menu 512 for controlling the screen through the first area 231*a* of the first display 230 positioned in the first housing 210.

For example, a flex state of the display 230 may be driven in a state where the second housing 220 is placed on a floor surface and the first housing 210 forms a specific angle with respect to the second housing 220. In this case, the fourth surface 222 of the second housing 220 may be placed to be oriented in the direction of gravity G. In case the second housing 220 is placed on a floor surface and the first housing 210 forms a specific angle with respect to second housing 220, the electronic device 200 may display the entirety or at least a part of a screen (e.g., the execution screen 410 in FIG. 4A to FIG. 4C) associated with an application which is being executed through the first area 231*a* of the first display 230 positioned in the first housing 210, and may display the control menu 512 for controlling the screen 511 through the second area 231*b* of the first display 230 positioned in the second housing 220.

The control menu 512 may include at least one control icon 512*a* for controlling the screen (e.g., the execution screen 410 in FIG. 4A to FIG. 4C). For example, in case the screen is an execution screen of an application, the control menu 512 may include at least one button 512*a* for controlling the execution screen. For example, in case the screen is a media playback application, the control menu 512 may include at least one button 512*a* for controlling media playback. For example, in case the screen is a camera application, the control menu 512 may include at least one button 512*a* associated with image capturing.

According to an embodiment, in case the first housing 210 is placed on a floor surface and the second housing 220 forms a specific angle with respect to first housing 210, the electronic device 200 may display the entirety or at least a part of a screen (e.g., the execution screen 410 in FIG. 4A to FIG. 4C) associated with an application which is being executed through the second area 231*b* of the first display 230 positioned in the second housing 220, and may display another application associated with the application which is being executed through the first area 231*a* of the first display 230 positioned in the first housing 210. For example, in case a video call application is being executed through the second area 231*b* of the first display 230, a contact application may be displayed through the first area 231*a* of the first display 230.

Figure 6:
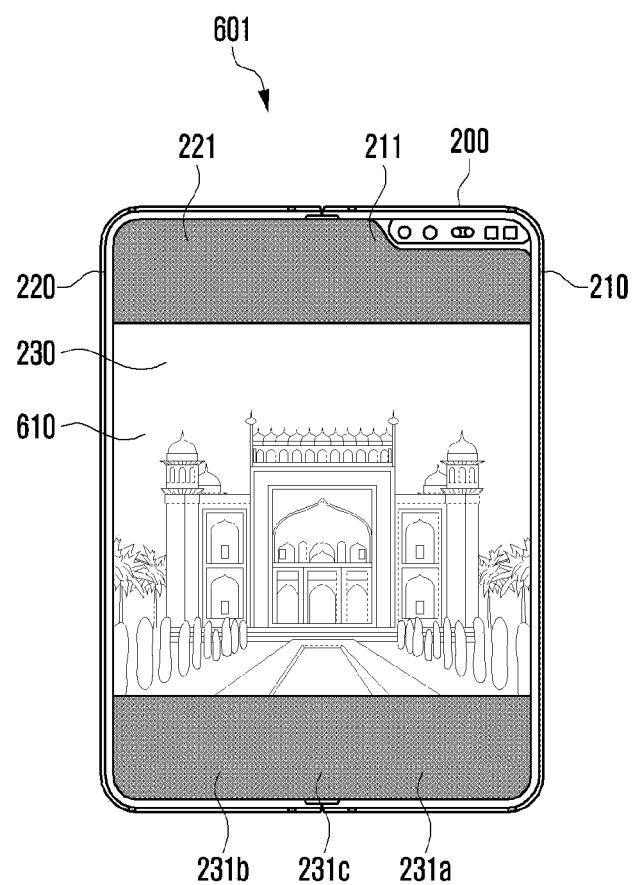
FIG. 6 is a diagram illustrating that a display operates in a large screen state in case an electronic device is in an unfolded state according to various embodiments.

FIG. 6 is a diagram illustrating an example in which a display 230 operates in a large screen state in case an electronic device 200 is in an unfolded state according to various embodiments.

In the disclosure, a "large screen state" of the electronic device 200 may refer, for example, to a state where the electronic device 200 controls the second display 252 to an off-state, controls the first display 230 to an on-state, and control such that an execution screen of an application is displayed on the entire display area of the first display 230. The term and expression "a large screen state" used in the disclosure may be changed to and replaced with terms such as a large screen mode, a main full screen state, and/or a main full screen mode.

Referring to FIG. 6, in case of being in an unfolded state, the electronic device 200 may be in a state 601 in which the display 230 operates in a large screen state 610.

In a large screen state of the display 230, the electronic device may change a resolution of a screen (e.g., the execution screen 410 in FIG. 4A to FIG. 4C) associated with an application, which is being executed, to a resolution corresponding to the entire area (e.g., the first area 231a, the second area 231b, and folding area 231c) of the first display 230, and may display the screen through the entire area of the first display 230. For example, the entire area of the display 230 may include a display area of the display 203.

In a large screen state of the display 320, the electronic device may control a second display (e.g., the second display 252 in FIG. 2A) to an off-state or a standby state.

Figure 19:
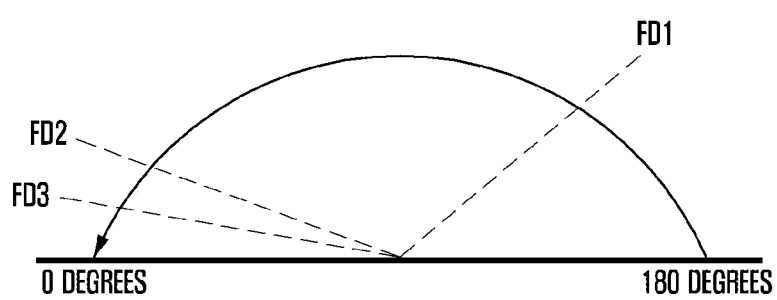
FIG. 19 is a graph illustrating a first folding threshold angle to a third folding threshold angle for controlling a drive state of a display in case an electronic device switches from an unfolded state to a folded state according to various embodiments.

In case unfolding starts after the display 320 changes to a large screen state, the electronic device may maintain the large screen state of the display 320 in case an angle (e.g., the angle between the first surface 211 and the third surface 221) between the first housing 210 and the second housing 220 is equal to and greater than a first folding threshold angle (e.g., the first folding threshold angle FD1 in FIG. 19).

According to various embodiments, as described in FIG. 4A to FIG. 6, the electronic device 200 as illustrated in FIG. 2A and FIG. 2B may control such that a display 230 (e.g., the display 320 in FIG. 3) operates in a standby state, a cover display state, a flex state, and/or a large screen state. For example, the electronic device 200 as illustrated in FIG. 2A and FIG. 2B may drive the display 230 in any one state according to the angle between the first housing 210 and the second housing 220 and whether the electronic device 200 is being folded or unfolded. For example, in case the angle between the first housing 210 and the second housing 220 increases with time, the electronic device 200 may determine that the electronic device 200 is being unfolded. For another example, in case the angle between the first housing 210 and the second housing 220 decreases with time, the electronic device 200 may determine that the electronic device 200 is being folded. Detailed descriptions regarding that the electronic device 200 drives the display 320 in any one state according to various embodiments of the disclosure will be described in detail later with reference to FIG. 9 to FIG. 21.

Figure 7A:
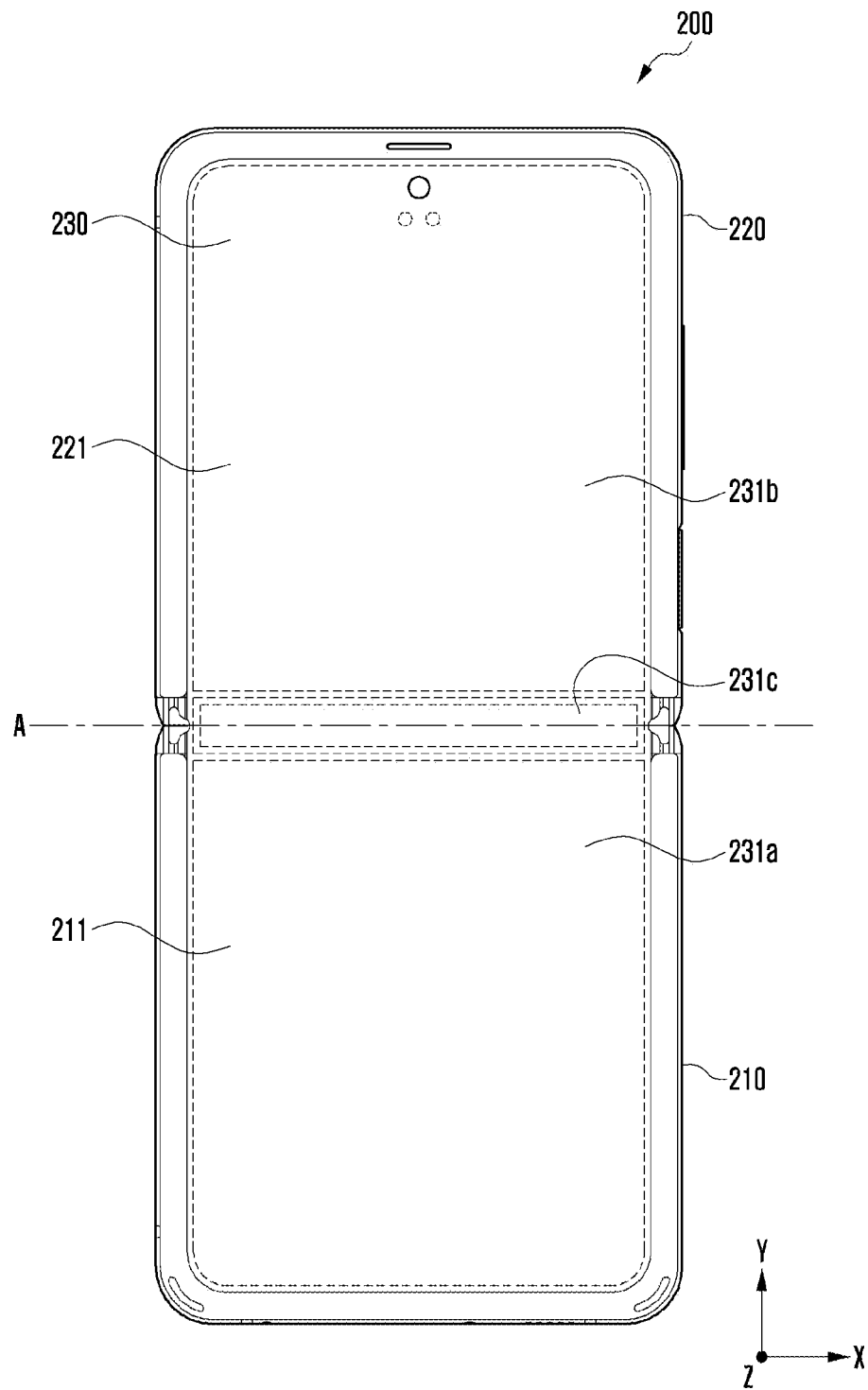
FIG. 7A is a diagram the front surface of a foldable electronic device in an unfolded state of the electronic device according to various embodiments.
Figure 7B:
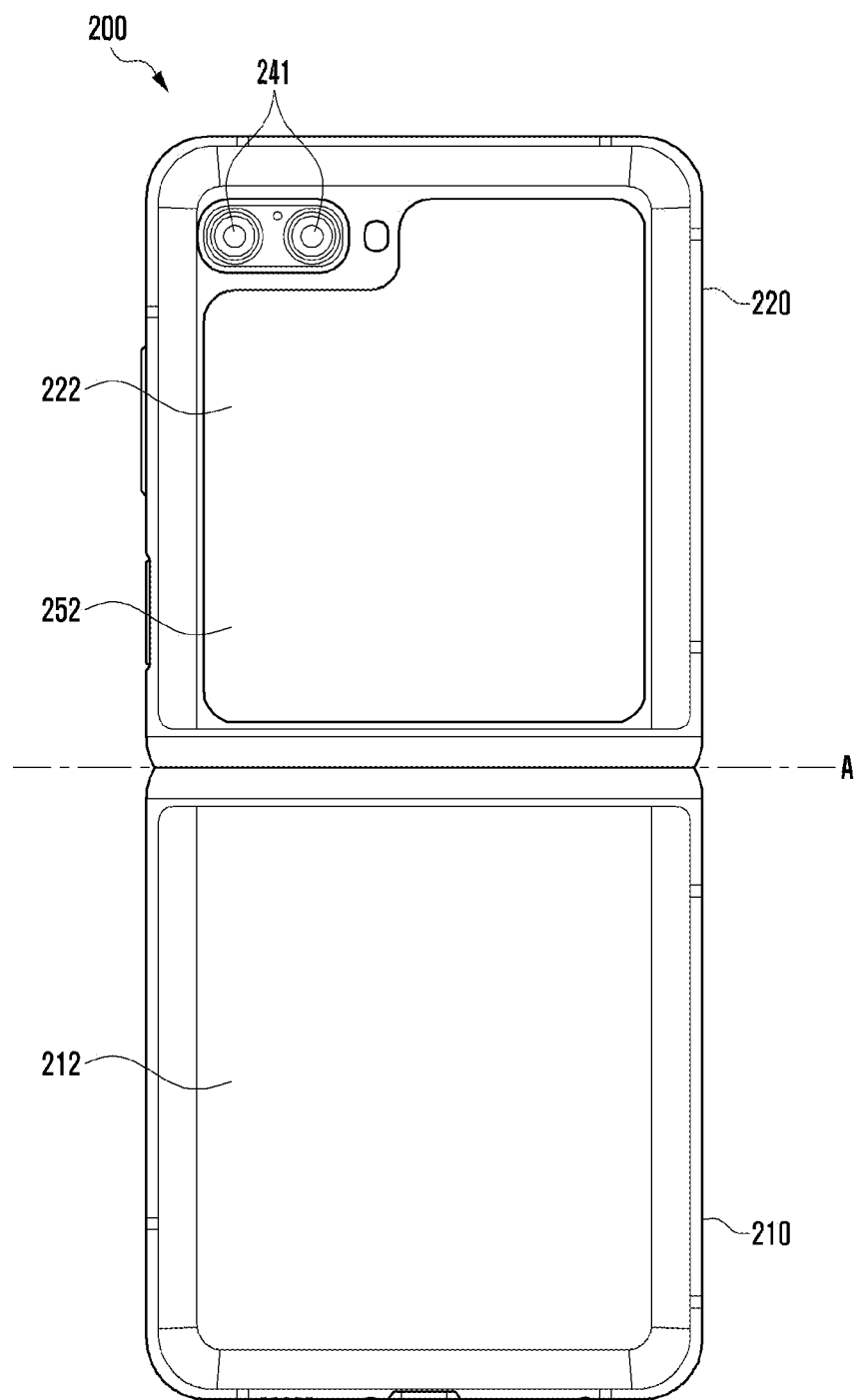
FIG. 7B is a diagram illustrating the rear surface of a foldable electronic device in an unfolded state of the electronic device according to various embodiments.

FIG. 7A is a diagram the front surface of a foldable electronic device 200 in an unfolded state of the electronic device 200 according to various embodiments. FIG. 7B is a diagram illustrating the rear surface of the foldable electronic device 200 in an unfolded state of the electronic device 200 according to various embodiments.

Figure 8A:
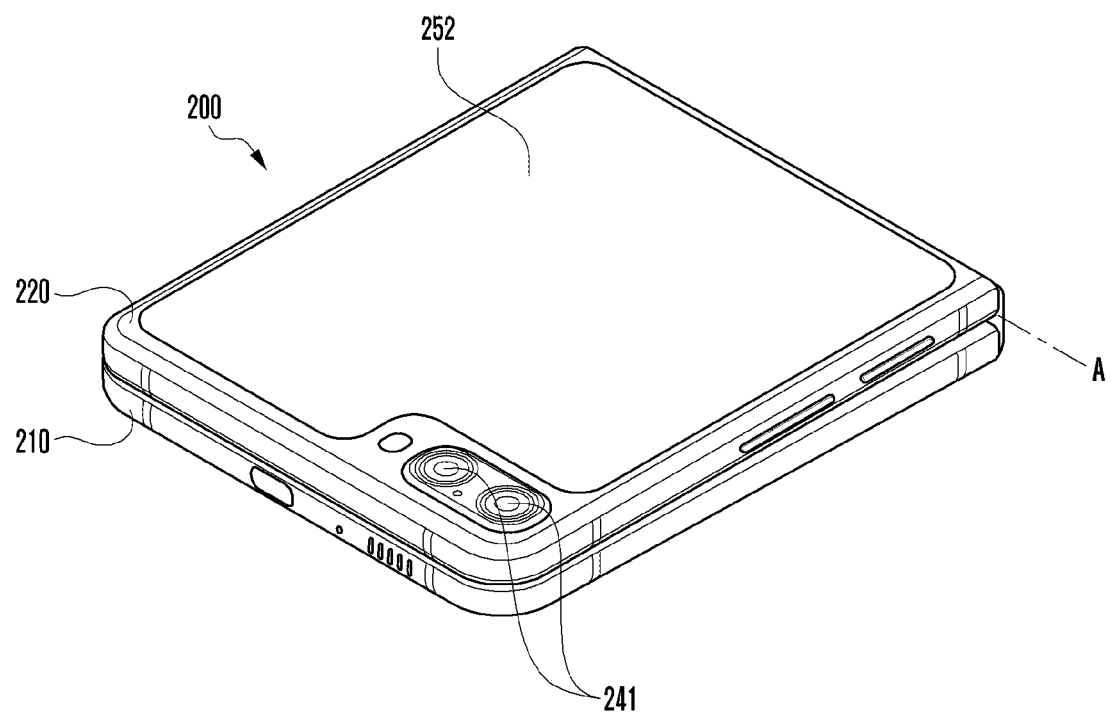
FIG. 8A is a perspective view illustrating a folded state (a folding state) of an electronic device according to various embodiments.
Figure 8B:
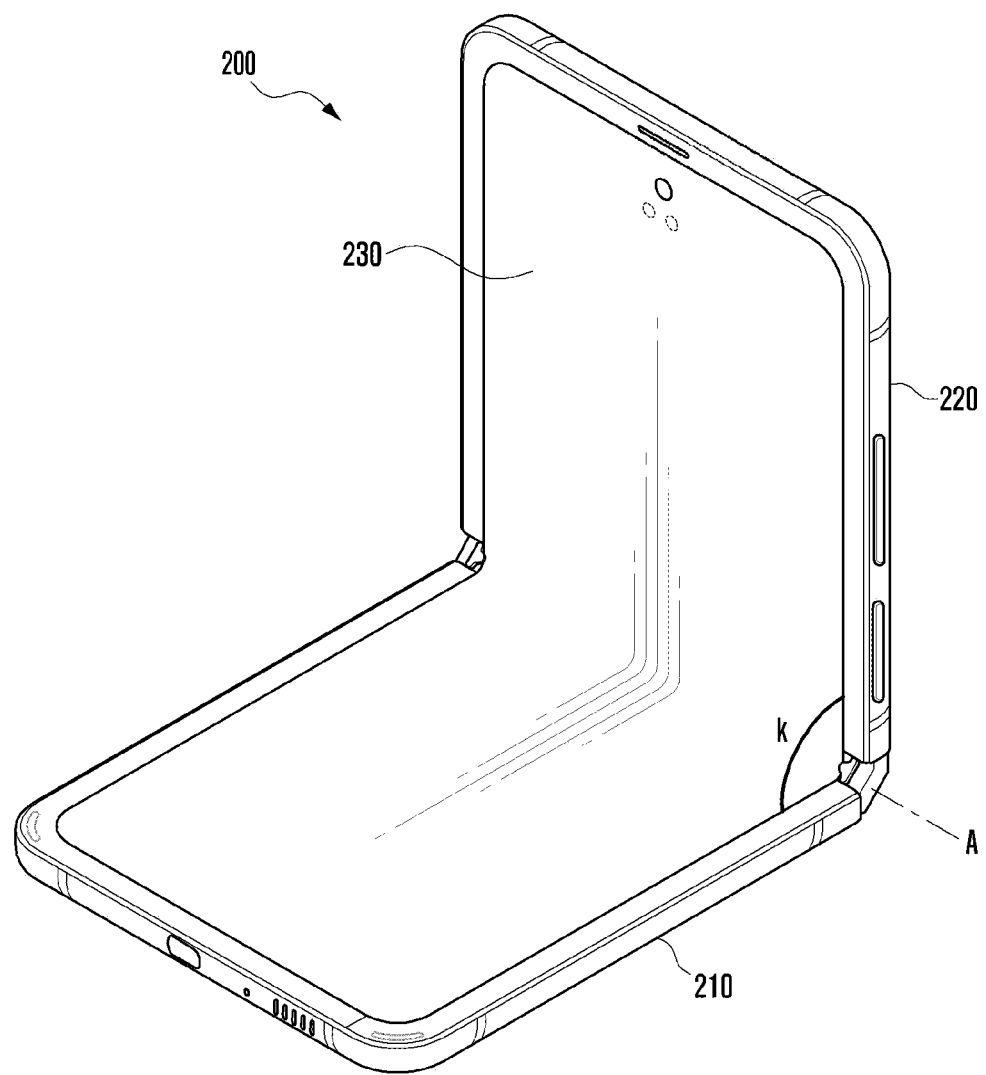
FIG. 8B is a perspective view illustrating an intermediate state of an electronic device according to various embodiments.

FIG. 8A is a perspective view illustrating a folded state (a folding state) of a foldable electronic 200 according to various embodiments. FIG. 8B is a perspective view illustrating an intermediate state of the foldable electronic device 200 according to various embodiments.

The electronic device 200 as illustrated in FIG. 7A to FIG. 8B may be at least partially similar to the electronic device 200 or 101 as illustrated in FIG. 1 or the electronic device 200 as illustrated in FIG. 2A and FIG. 2B, or may include various embodiments. In describing the electronic device 200 as illustrated in FIG. 7A to FIG. 8B, elements identical to or similar to those of the electronic device 200 as illustrated in FIG. 2A and FIG. 2B will be denoted by the same reference numerals.

Hereinafter, in conjunction with FIG. 7A to FIG. 8B, features of the electronic device 200, which are not described in or differ from FIG. 1 or FIG. 2A and FIG. 2B, will be described.

The electronic device 200 as illustrated in FIG. 7A to FIG. 8B may include a first housings 210 and a second housing 220 which face each other with reference to a hinge (not shown) and are rotatably coupled to be foldable.

The first housing 210 may include a first surface 211 oriented in a first direction and a second surface (e.g., the second surface 212 in FIG. 7B) oriented in a second direction opposite to the first direction.

The hinge may be connected to one side surface of the first housing 210 and one side surface of the second housing 220, and may be folded in a first rotation direction or be unfolded in a second rotation direction.

The second housing 220 may be connected to the hinge, and may include a third surface 221 oriented in a third direction and a fourth surface (e.g., the fourth surface 222 in FIG. 7B) oriented in a fourth direction.

The first display 230 may be positioned on the first surface 211 of the first housing 210 and the third surface 221 of the second housing 220. The first display 230 may include a first area 231a positioned on the first surface 211 of the first housing 210, a second area 231b positioned on the third surface 221 of the second housing 220, and a folding area 231c positioned to correspond to the hinge.

The second display 252 may be disposed on the fourth surface 222 of the second housing 220.

A camera module 241 (e.g., the camera module 180 in FIG. 1) may be positioned on the fourth surface 222 of the second housing 220 to be adjacent to the second display 252.

The first housing 210 and the second housing 220 may be arranged at both sides around a folding axis A defined by the hinge, and the folding axis A may be disposed to be perpendicular to the lengthwise direction (e.g., the y-axis direction in FIG. 7A) of the first display 230. For example, the first display 230 may have a shape having a long length in the y-axis direction, and the folding axis A may be disposed to cross the first display 230 in the x-axis direction.

According to various embodiments, as described in FIG. 4A to FIG. 6, the electronic device 200 as illustrated in FIG. 7A to FIG. 8B may control such that the display 320 operates in a standby state, a cover display state, a flex state, and/or a large screen state. For example, the electronic device 200 as illustrated in FIG. 7A to FIG. 8B may drive the display 320 in any one state according to the angle (e.g., k in FIG. 8B) between the first housing 210 and the second housing 220 and whether the electronic device 200 is being folded or unfolded. Detailed descriptions in that the electronic device 200 drives the display 320 in any one state according to various embodiments of the disclosure will be described in detail later with reference to FIG. 9 to FIG. 21.

A foldable electronic device (e.g., the electronic device 200 in FIG. 2A) according to various example embodiments of the disclosure may include: a first housing (e.g., the first housing 210 in FIG. 2A) including a first surface oriented in a first direction and a second surface oriented in a second direction opposite to the first direction, a second housing (e.g., the second housing 220 in FIG. 2A) including a third surface oriented in a third direction and a fourth surface oriented in a fourth direction opposite to the third direction, a hinge coupled to the first housing and the second housing and to which at least one of the first housing and the second housing is rotatably connected, a first display (e.g., the first display 230 in FIG. 2A) positioned on the first surface and the third surface, a second display (e.g., the second display 252 in FIG. 2A) positioned on the fourth surface, a sensor module, comprising at least on sensor, configured to detect an arrangement state of and an angle between the first housing and the second housing, and a processor (e.g., the processor 120 in FIG. 1) operatively connected to the first display, the second display, and the sensor module, wherein the processor may be configured to: detect that unfolding of the foldable electronic device starts based on the foldable electronic device being in a folded state and a screen is displayed through the second display, based on the angle between the first housing and the second housing exceeding a second unfolding threshold angle (e.g., the second unfolding threshold angle UFD2 in FIG. 18), control the second display to an off-state, control the first display to display at least a part of a screen displayed through the second display through a first area of the first display positioned on the first surface, and to display a menu for controlling a screen displayed through the first area through a second area of the first display positioned on the third surface, and based on the angle between the first housing and the second housing exceeding a third unfolding threshold angle (e.g., the third unfolding threshold angle UFD3 in FIG. 18), to display at least a part of a screen displayed through the first area and the second area through the entire area of the first display, wherein the third unfolding threshold angle may be greater than the second unfolding threshold angle.

According to an example embodiment, the processor may be configured to: detect that unfolding of the foldable housings starts in an off-state of the first display and the second display in the folded state, and control the first display to an on-state based on the angle between the first housing and the second housing exceeding a first unfolding threshold angle (e.g., the first unfolding threshold angle UFD1 in FIG. 18) less than the second unfolding threshold angle.

According to an example embodiment, the processor may be configured to set the second unfolding threshold angle to an acute angle, and set the third unfolding threshold angle to an obtuse angle.

According to an embodiment, the processor may be configured to detect whether the angle between the first housing and the second housing exceeds the second unfolding threshold angle based on the screen displayed through the second display being controlled to be displayed in the lengthwise direction of the second display in the folded state.

According to an example embodiment, the processor may be configured to: detect whether the angle between the first housing and the second housing exceeds a first unfolding threshold angle less than the second unfolding threshold angle based on the screen not being controlled to be displayed in the lengthwise direction of the second display, control the first display to an on-state and control the second display to an off-state based on the angle between the first housing and the second housing exceeding the first unfolding threshold angle, and control the first display to an off-state and control the second display to an off-state based on the angle between the first housing and the second housing being less than or equal to the first unfolding threshold angle.

According to an example embodiment, the processor may be configured to: maintain a state of displaying a screen through the second display even where the angle between the foldable housings exceeding the second unfolding threshold angle based on an angular speed, at which the angle between the first housing and the second housing changes, decreasing.

According to an example embodiment, the processor may be configured to: display a screen change button through the second display based on an angle between the foldable housings exceeding the second unfolding threshold angle where the angular speed decreases, and based on an input for the screen change button being received, control the second display to an off-state and display at least a part of a screen displayed through the second display through at least a partial area of the first display.

According to an example embodiment, the processor may be configured to: maintain a state where the screen is displayed through the second display where the angle between the first housing and the second housing exceeds the second unfolding threshold angle based on a part of a side surface of the first housing and a part of a side surface of the second housing being placed on a surface.

According to an example embodiment, the processor may be configured to: display a screen change button through the second display based on an angle between the foldable housings exceeding the second unfolding threshold angle where a screen is displayed through the second display and a part of a side surface of the first housing and a part of a side surface of the second housing are placed on a surface, and based on an input for the screen change button being received, control the second display to an off-state and display at least a part of a screen displayed through the second display through at least a partial area of the first display.

According to an example embodiment, the processor may be configured to: detect that folding of the foldable electronic device starts based on the foldable electronic device being in an unfolded state and a screen being displayed through the entire area of the first display, and based on the angle between the first housing and the second housing being less than a first folding threshold angle, and control the first display to display at least a part of the screen displayed through a first area of the first display positioned on the first surface and to display a menu for controlling the screen through a second area of the first display positioned on the third surface, wherein the first folding threshold angle may be less than the third unfolding threshold angle.

According to an example embodiment, the processor may be configured to: detect that folding of the foldable housings starts based on the foldable electronic device being in an unfolded state and a screen being displayed through the entire area of the first display, and control the first display to an off-state and to display the screen through the second display based on the angle between the first housing and the second housing being less than a second folding threshold angle, wherein the second folding threshold angle may be less than the second unfolding threshold angle.

According to an example embodiment, the processor may be configured to: detect that folding of the foldable electronic device starts based on the foldable electronic device being in an unfolded state and a screen being displayed through the entire area of the first display, control the first display to an off-state and display the screen through the second display based on the angle between the first housing and the second housing being less than a third folding threshold angle and a specified setting being activated, and control the first display and the second display to an off-state based on the angle between the first housing and the second housing being less than the third folding threshold angle and the specified setting being deactivated.

In a method for driving a foldable electronic device (e.g., the electronic device 200 in FIG. 2A) according to various example embodiments, the electronic device may include: a first housing (e.g., the first housing 210 in FIG. 2A) including a first surface oriented in a first direction and a second surface oriented in a second direction opposite to the first direction, a second housing (e.g., the second housing 220 in FIG. 2A) including a third surface oriented in a third direction and a fourth surface oriented in a fourth direction opposite to the third direction, a hinge coupled to the first housing and the second housing and to which at least one of the first housing and the second housing is rotatably connected, a first display (e.g., the first display 230 in FIG. 2A) positioned on the first surface and the third surface, and a second display (e.g., the second display 252 in FIG. 2A) positioned on the fourth surface, the method may include: detecting that unfolding of the foldable electronic device starts based on the foldable electronic device being in a folded state and a screen being displayed through the second display, based on an angle between the first housing and the second housing exceeding a second unfolding threshold angle (e.g., the second unfolding threshold angle UFD2 in FIG. 18), controlling the second display to an off-state, displaying at least a part of a screen displayed through the second display through a first area of the first display positioned on the first surface, and displaying a menu for controlling a screen displayed through the first area through a second area of the first display positioned on the third surface, and based on the angle between the first housing and the second housing exceeding a third unfolding threshold angle (e.g., the third unfolding threshold angle UFD3 in FIG. 18), displaying at least a part of a screen displayed through the first area and the second area through the entire area of the first display, wherein the third unfolding threshold angle may be greater than the second unfolding threshold angle.

The method according to an example embodiment may further include: detecting that unfolding of the foldable electronic device starts in an off-state of the first display and the second display in a folded state of the foldable electronic device, and controlling the first display to an on-state based on the angle between the first housing and the second housing exceeding a first unfolding threshold angle (e.g., the first unfolding threshold angle UFD1 in FIG. 18) less than the second unfolding threshold angle.

The method according to an example embodiment, in a folded state of the foldable electronic device, based on the screen displayed through the second display being controlled to be displayed in the lengthwise direction of the second display, may further include: detecting whether the angle between the first housing and the second housing exceeds the second unfolding threshold.

The method according to an example embodiment may further include detecting whether the angle between the first housing and the second housing exceeds the first unfolding threshold angle less than the second unfolding threshold angle based on the screen not being controlled to be displayed in the lengthwise direction of the second display, controlling the first display to an on-state and controlling the second display in an off-state based on the angle between the first housing and the second housing exceeding the first unfolding threshold angle, and controlling the first display to an off-state and controlling the second display to an off-state based on the angle between the first housing and the second housing being less than or equal to the first unfolding threshold angle.

The method according to an example embodiment may further include maintaining a state of displaying a screen through the second display based on the angle between the first housing and the second housing exceeding the second unfolding threshold angle based on an angular speed, at which the angle between the first housing and the second housing changes, decreasing.

The method according to an example embodiment may further include displaying a screen change button through the second display based on the angle between the first housing and the second housing exceeding the second unfolding threshold angle based on a screen being displayed through the second display and an angular speed, at which the angle between the first housing and the second housing increases, decreasing, and an controlling the second display to an off-state and displaying the screen through at least a partial area of the first display based on an input for the screen change button being received.

The method according to an example embodiment may further include maintaining a state of displaying a screen through the second display based on the angle between the first housing and the second housing exceeding the second unfolding threshold angle based on a part of a side surface of the first housing and a part of the side surface of the second housing being placed on a surface.

The method according to an example embodiment may further include displaying a screen change button through the second display based on a screen being displayed through the second display and the angle of the first housing and the second housing exceeding the second unfolding threshold angle based on a part of a side surface of the first housing and a part of a side surface of the second housing being placed on a surface, and controlling the second display to an off-state and displaying the screen through at least a partial area of the first display based on an input for the screen change button being received.

Figure 9:
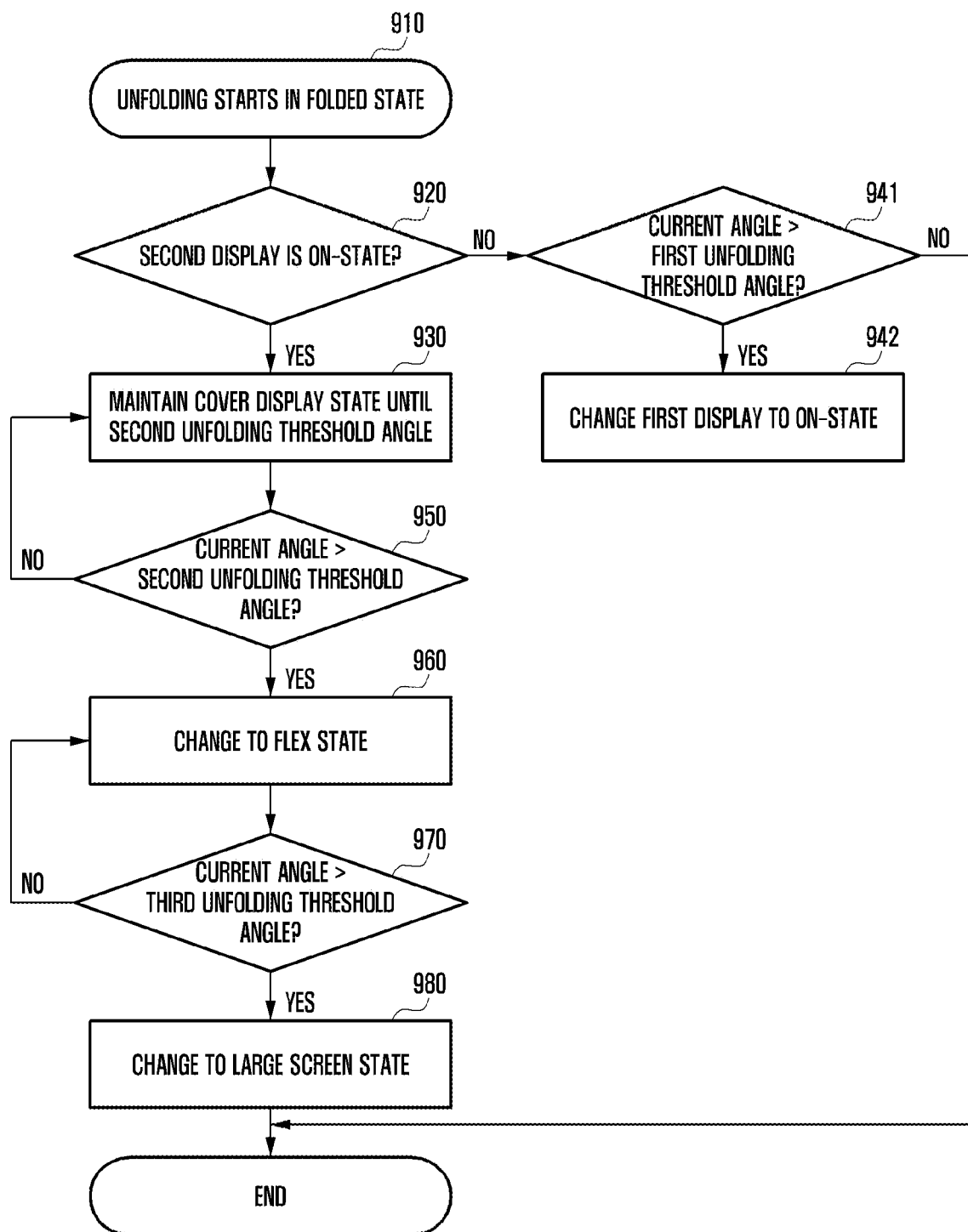
FIG. 9 is a flowchart illustrating an example method for controlling a drive state of a display in case an electronic device changes from a folded state to an unfolded state according to various embodiments.

FIG. 9 is a flowchart illustrating an example method for controlling a drive state of a display 320 based on an electronic 200 changing from a folded state to an unfolded state according to various embodiments.

At least a part of the operations as illustrated in FIG. 9 may be omitted. At least some operations of the electronic device 200 described with reference to other drawings of the disclosure may be additionally inserted before or after at least some operations illustrated in FIG. 9.

Each of the operations illustrated in FIG. 9 may be performed by a processor (e.g., the processor 120 in FIG. 1) of the electronic device 200. For example, a memory (e.g., the memory 130 in FIG. 1) of the electronic device 200 may store instructions which, when executed, cause the processor 120 to perform at least some operations as illustrated in FIG. 9.

Referring to FIG. 9, in case unfolding starts, an electronic device (e.g., the electronic device 200 in FIGS. 2A and 2B) may calculate a range to which the angle between the first housing 210 and the second housing 220 corresponds, based on a first unfolding threshold angle (e.g., the first unfolding threshold angle UFD1 in FIG. 18), a second unfolding threshold angle (e.g., the second unfolding threshold angle UFD2 in FIG. 18), and/or a third unfolding threshold angle (e.g., the third unfolding threshold angle UFD3 in FIG. 18), and may control a drive state of the display 320 according to the range corresponding to the angle between the first housing 210 and the second housing 220.

For example, the first unfolding threshold angle UFD1 may be an acute angle and may be a threshold angle for changing the first display 230 from an off-state to an on-state. For example, the electronic device 200 may change the first display 230 to an on-state in case the angle between the first housing 210 and the second housing 220 exceeds the first unfolding threshold angle UFD1 while the first display 230 is in an off-state and the second display 252 is in an off-state or a standby state. For example, the electronic device 200 may maintain the first display 230 in an off-state in case the angle between the first housing 210 and the second housing 220 is less than or equal to the first unfolding threshold angle UFD1.

For example, the second unfolding threshold angle UFD2 may be an acute angle greater than the first unfolding threshold angle UFD1, and may be a threshold angle for changing the display 320 from a cover display state to a flex state. For example, the electronic device 200 may maintain the display 320 in a flex state in case the angle between the first housing 210 and the second housing 220 exceeds the second unfolding threshold angle UFD2 during a cover display state. For example, the electronic device 200 may maintain a cover display state in case the angle between the first housing 210 and the second housing 220 exceeds the first unfolding threshold angle UFD1 and is less than or equal to the second unfolding threshold angle UFD2.

For example, the third unfolding threshold angle UFD3 may be an obtuse angle greater than the second unfolding threshold angle UFD2, and may be a threshold angle for changing the display 320 from a flex state to a large screen state. For example, the electronic device 200 may control the display 320 to a large screen state in case the angle between the first housing 210 and the second housing 220 exceeds the third unfolding threshold angle UFD3 during a flex state. For example, the electronic device 200 may maintain a flex state in case the angle between the first housing 210 and the second housing 220 exceeds the second unfolding threshold angle UFD2 and is less than or equal to the third unfolding threshold angle UFD3.

In operation 910, the electronic device 200 may detect that unfolding between the first housing 210 and the second housing 220 starts. For example, the electronic device 200 may detect that the change from a folded state to an intermediate state starts. The electronic device 200, through the sensor module 176, may detect that unfolding of the electronic device 200 starts.

In operation 920, the electronic device 200 may identify whether the second display 252 is in an on-state in case unfolding starts. For example, the electronic device 200 may identify whether unfolding starts from a folded state and a cover display state.

The electronic device 200 may perform operation 930 in case unfolding starts from a folded state and a cover display state (e.g., the result of operation 920 is "YES").

The electronic device 200 may perform operation 941 in case unfolding starts from an off-state of the first display 320 and an off-state of the second display 252 (or a standby state of the second display 252) (e.g., the result of operation 920 is "NO").

In operation 930, the electronic device 200 may maintain a cover display state in case unfolding starts from a folded state and a cover display state.

According to various embodiments, the electronic device 200 may deactivate a touch input through the second display 252 for a designated time in case a change in the angle between the first housing 210 and the second housing 220 is detected in a cover display state. For example, the electronic device 200 may deactivate a touch input through the second display 252 while the angle between the first housing 210 and the second housing 220 changes, to prevent and/or inhibit an unintentional touch input by the user. In the disclosure, that the electronic device 200 deactivates a touch input may refer, for example, to a "touch lock function". According to an embodiment, the electronic device 200 may not process or may disregard a touch input even in case a touch input is detected in case a touch lock function is activated. In various embodiments, the electronic device 200 may display an icon for releasing a touch lock function through at least a portion of the display 320 in case a touch lock function is activated, and may release the touch lock function in case a user inputs a designated gesture (e.g., drag) through the icon. In this case, the electronic device 200 may not process or ignore the remaining touch inputs other than the touch input with respect to the icon.

In operation 941, the electronic device 200 may identify whether the angle between the first housing 210 and the second housing 220 exceeds the first unfolding threshold angle UFD1.

The electronic device 200 may perform operation 942 in case the angle between the first housing 210 and the second housing 220 exceeds the first unfolding threshold angle UFD1 (e.g., the result of operation 941 is "YES").

The electronic device 200 may control the first display 230 and the second display 252 to an off-state in case the angle between the first housing 210 and the second housing 220 is less than or equal to the first unfolding threshold angle UFD1 (e.g., the result of operation 941 is "NO"). In various embodiments, the electronic device 200 may perform operation 941 again in case the angle between the first housing 210 and the second housing 220 is less than or equal to the first unfolding threshold angle UFD1 (e.g., the result of operation 941 is "NO").

In operation 942, in case it is detected that the angle between the first housing 210 and the second housing 220 exceeds the first unfolding threshold angle UFD1, the electronic device 200 may change the first display 230 to an on-state, and may maintain the second display 252 in an off-state (or a standby state). Although not illustrated, in case the first display 230 changes to an on-state, the electronic device 200 may operate in a folded state, an intermediate state, and/or an unfolded state, based on the angle between the first housing 210 and the second housing 220.

In case the first display 230 changes to on-state, the electronic device 200 may control to display a designated screen (e.g., a home screen) or a screen (e.g., a previous execution screen) based on a user setting.

In operation 950, the electronic device 200 may identify whether the angle between the first housing 210 and the second housing 220 exceeds the second unfolding threshold angle UFD2 during a cover display state.

The electronic device 200 may perform operation 960 in case the angle between the first housing 210 and the second housing 220 exceeds the second unfolding threshold angle UFD2 (e.g., the result of operation 950 is "YES").

The electronic device 200 may perform operation 930 again in case the angle between the first housing 210 and the second housing 220 is less than or equal to the second unfolding threshold angle UFD2 (e.g., the result of operation 950 is "NO").

In operation 960, the electronic device 200 may change the display 320 to a flex state in case the angle between the first housing 210 and the second housing 220 exceeds the second unfolding threshold angle UFD2 during a cover display state. For example, based on detecting that the angle between the first housing 210 and the second housing 220 exceeds the second unfolding threshold angle UFD2, the electronic device 200 may change the second display 252 to an off-state (or a standby state), and may change the first display 230 to an on-state.

In a flex state of the display 320, the electronic device 200 may detect a direction in which the electronic device 200 is placed, and may control the entirety or at least a part of a screen displayed on the second display 252 in a cover display state is displayed in the first area 231*a* or the second area 231*b* of the display 320 according to the direction in which the electronic device 200 is placed.

For example, a flex state of the display 320 may be driven in a state where the first housing 210 is placed on a floor surface (e.g., in the direction of gravity G) and the second housing 220 forms a specific angle with respect to the first housing 210. In this case, the second surface of the first housing 210 may be placed to be oriented in the direction of gravity G. In case the first housing 210 is placed on a floor surface and the second housing 220 forms a specific angle with respect to first housing 210, the electronic device 200 may display the entirety or at least a part of a screen displayed on the second display 252 in a cover display state through the second area 231*b* of the first display 230 positioned in the second housing 220, and may display a control menu for controlling the screen through the first area 231*a* of the first display 230 positioned in the first housing 210.

For example, a flex state of the display 320 may be driven in a state where the second housing 220 is placed on a floor surface and the first housing 210 forms a specific angle with respect to the second housing 220. In this case, the fourth surface of the second housing 220 may be placed to be oriented in the direction of gravity G. In case the second housing 220 is placed on a floor surface and the first housing 210 forms a specific angle with respect to second housing 220, the electronic device 200 may display the entirety or at least a part of a screen displayed on the second display 252 in a cover display state through the first area 231*a* of the first display 230 positioned in the first housing 210, and may display a control menu for controlling the screen through the second area 231*b* of the first display 230 positioned in the second housing 220.

The control menu 512 may include at least one control icon (e.g., the control icon 512*a* in FIG. 5) for controlling the screen (e.g., the execution screen 410 in FIG. 4A to FIG. 4C). For example, in case the screen is an execution screen of an application, the control menu 512 may include at least one button 512*a* for controlling the execution screen. For example, in case the screen is an execution screen of a media playback application, the control menu 512 may include at least one button 512*a* for controlling media playback. For example, in case the screen is an execution screen of a camera application, the control menu 512 may include at least one button 512*a* associated with image capturing.

In operation 970, the electronic device 200 may identify whether the angle between the first housing 210 and the second housing 220 exceeds the third unfolding threshold angle UFD3 during a flex state.

The electronic device 200 may perform operation 980 in case the angle between the first housing 210 and the second housing 220 exceeds the third unfolding threshold angle UFD3 (e.g., the result of operation 970 is "YES").

The electronic device 200 may perform operation 960 again in case the angle between the first housing 210 and the second housing 220 is less than or equal to the third unfolding threshold angle UFD3 (e.g., the result of operation 970 is "NO").

In operation 980, the electronic device 200 may change the display 320 to a large screen state in case the angle between the first housing 210 and the second housing 220 exceeds the third unfolding threshold angle UFD3 during a flex state. For example, based on detecting that the angle between the first housing 210 and the second housing 220 exceeds the third unfolding threshold angle UFD3, the electronic device 200 may change a resolution of a screen displayed through the first area 231*a* or the second area 231*b* of the first display 230 to a resolution corresponding to the entire area of the first display 230, and may display a screen displayed in the flex state through the entire area of the first display 230.

Figure 10:
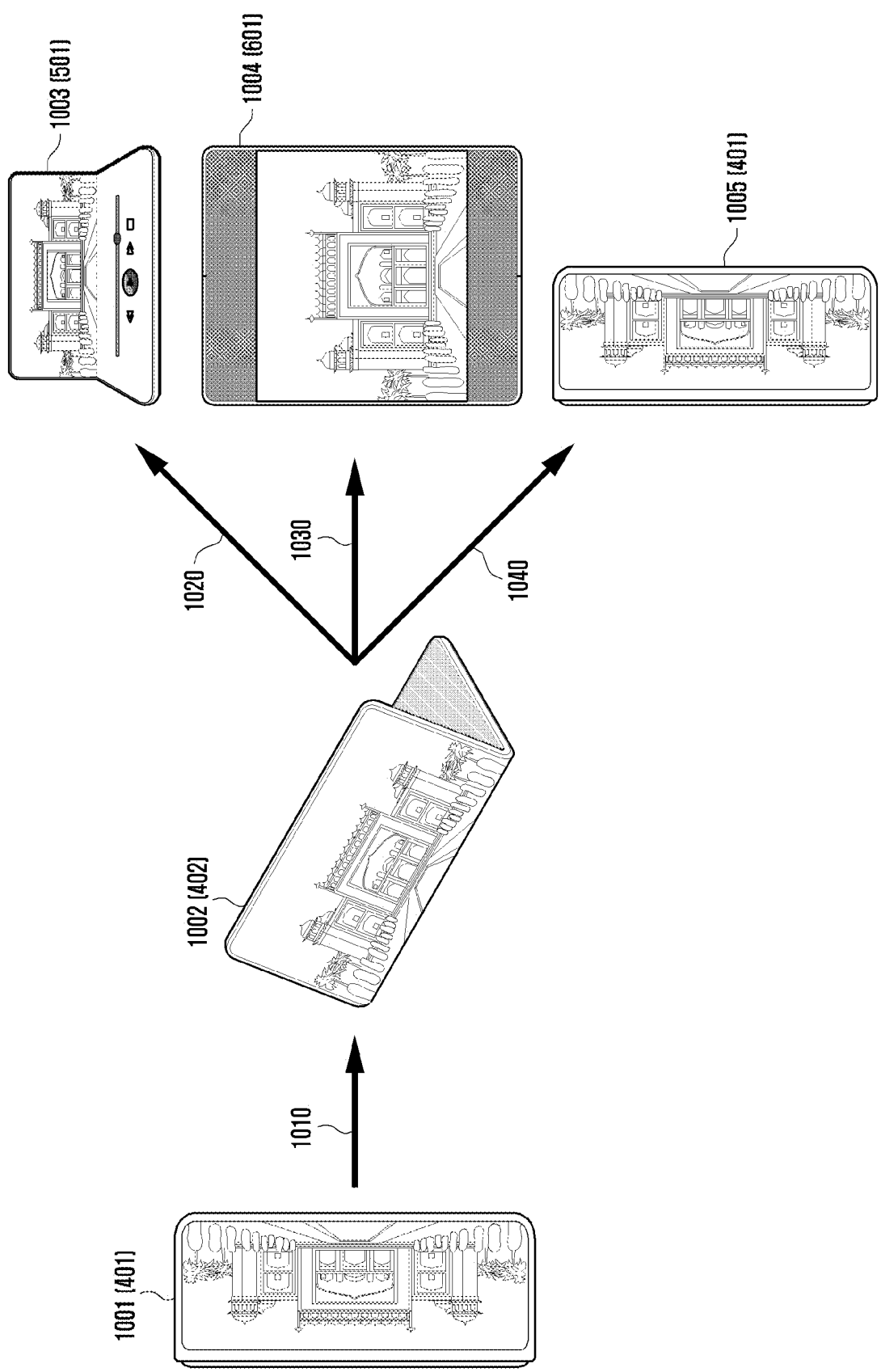
FIG. 10 is a diagram illustrating an example scenario for controlling a drive state of a display in case an electronic device switches from a folded state to an unfolded state according to various embodiments.

FIG. 10 is a diagram illustrating an example scenario for controlling a drive state of a display 320 in case an electronic device 200 switches from a folded state to an unfolded state according to various embodiments. Hereinafter, in conjunction with FIG. 9 and FIG. 10, the change of a drive state of the display 320 will be described.

In FIG. 10, reference numeral 1001 and reference numeral 1005 show states of the electronic device 200 in which the display 320 is controlled to a cover display state in a folded state between the first housing 210 and the second housing 220. For example, the states of the electronic device 200 according to the reference numerals 1001 and 1005 in FIG. 10 may be the same as or similar to the state 401 of the electronic device 200 as illustrated in FIG. 4A.

In FIG. 10, reference numeral 1002 shows a state of the electronic device 200 in which the display 320 is controlled to a cover display state in a state where the angle between the first housing 210 and the second housing 220 is less than or equal to the second unfolding threshold angle UFD2. For example, the state of the electronic device 200 according to the reference numeral 1002 in FIG. 10 may be the same as or similar to the state 402 of the electronic device 200 as illustrated in FIG. 4B.

In FIG. 10, reference numeral 1003 shows a state of the electronic device 200 in which the display 320 is controlled to a flex state in a state where the angle between the first housing 210 and the second housing 220 is greater than the second unfolding threshold angle UFD2 and is less than or equal to the third unfolding threshold angle UFD3. For example, the state of the electronic device 200 according to the reference numeral 1003 in FIG. 10 may be the same as or similar to the state 501 of the electronic device 200 as illustrated in FIG. 5.

In FIG. 10, reference numeral 1004 shows a state of the electronic device 200 in which the display 320 is controlled to a large screen display state in case the angle between the first housing 210 and the second housing 220 is greater than the third unfolding threshold angle UFD3. For example, the state of the electronic device 200 according to the reference numeral 1004 in FIG. 10 may be the same as or similar to the state 601 of the electronic device 200 as illustrated in FIG. 6.

Scenarios 1010, 1020, 1030, and 1040 in FIG. 10 show that the angle (e.g., an unfolding threshold angle) between the first housing 210 and the second housing 220 is changed. For example, the scenarios 1010, 1020, 1030, and 1040 may indicate a state change of the display 320, based on the unfolding threshold angles (UFD1 to UFD3).

Referring to the scenario 1010 in FIG. 10, as described in operation 930 in FIG. 9, in case unfolding is detected through the sensor module 176, the electronic device 200 may maintain a cover display state until the angle between the first housing 210 and the second housing 220 reaches the second unfolding threshold angle UFD2. For example, the electronic device 200 may maintain a cover display state in case the angle between the first housing 210 and the second housing 220 is less than or equal to the second unfolding threshold angle UFD2.

Referring to the scenario 1020 in FIG. 10, as described in operation 960 in FIG. 9, the electronic device 200 may switch the display 320 to a flex state in case the angle between the first housing 210 and the second housing 220 exceeds the second unfolding threshold angle UFD2. After the display 320 is switched to a flex state, the electronic device 200 may control the display 320 to a flex state until the angle between the first housing 210 and the second housing 220 reaches the third unfolding threshold angle UFD3.

Referring to the scenario 1030 in FIG. 10, as described in operation 980 in FIG. 9, the electronic device 200 may switch the display 320 to a large screen state in case the angle between the first housing 210 and the second housing 220 exceeds the third unfolding threshold angle UFD3. For example, based on detecting that the angle between the first housing 210 and the second housing 220 exceeds the third unfolding threshold angle UFD3, the electronic device 200 may change a resolution of a screen displayed through the first area 231*a* or the second area 231*b* of the first display 230 to a resolution corresponding to the entire area of the first display 230, and may display a screen displayed in the flex state through the entire area of the first display 230.

Referring to the scenario 1040 in FIG. 10, the electronic device 200 may maintain a cover display state in case of becoming a folded state. That a cover display state is maintained as the electronic device 200 becomes a folded state may be adjusted based on a user setting.

In the disclosure, a user setting may refer, for example, to an "app continuity setting". According to various embodiments, activation or deactivation of the app continuity setting is set as a default at the time of mass production of the electronic device 200, or may be set according to a user input through a screen for setting functions of the electronic device 200.

According to an embodiment, in case the app continuity setting is activated, the electronic device 200 may maintain a cover display state as the electronic device 200 becomes a folded state from an unfolded state and/or an intermediate state.

According to an embodiment, in case the app continuity setting is deactivated, the electronic device 200 may release the cover display state and then may control the second display 252 to an off-state (or a standby state), as the electronic device 200 becomes a folded state from an unfolded state and/or an intermediate state.

According to various embodiments, the electronic device 200 may switch to a cover display state, a flex state, and/or a large screen state, based on the angle between the first housing 210 and the second housing 220. The electronic device 200 may control the display 320, based on the cover display state, the flex state, and/or the large screen state. According to an embodiment, the electronic device 200 may switch to the cover display state, the flex state, and/or the large screen state, based on the change amount of angle between the first housing 210 and the second housing 220 (e.g., the change amount of angular speed) or the time in which the angle between the first housing 210 and the second housing 220 is maintained. For example, a state change thereof may not be performed in case the angle between the first housing 210 and the second housing 220 changes more than a designated speed.

Figure 11:
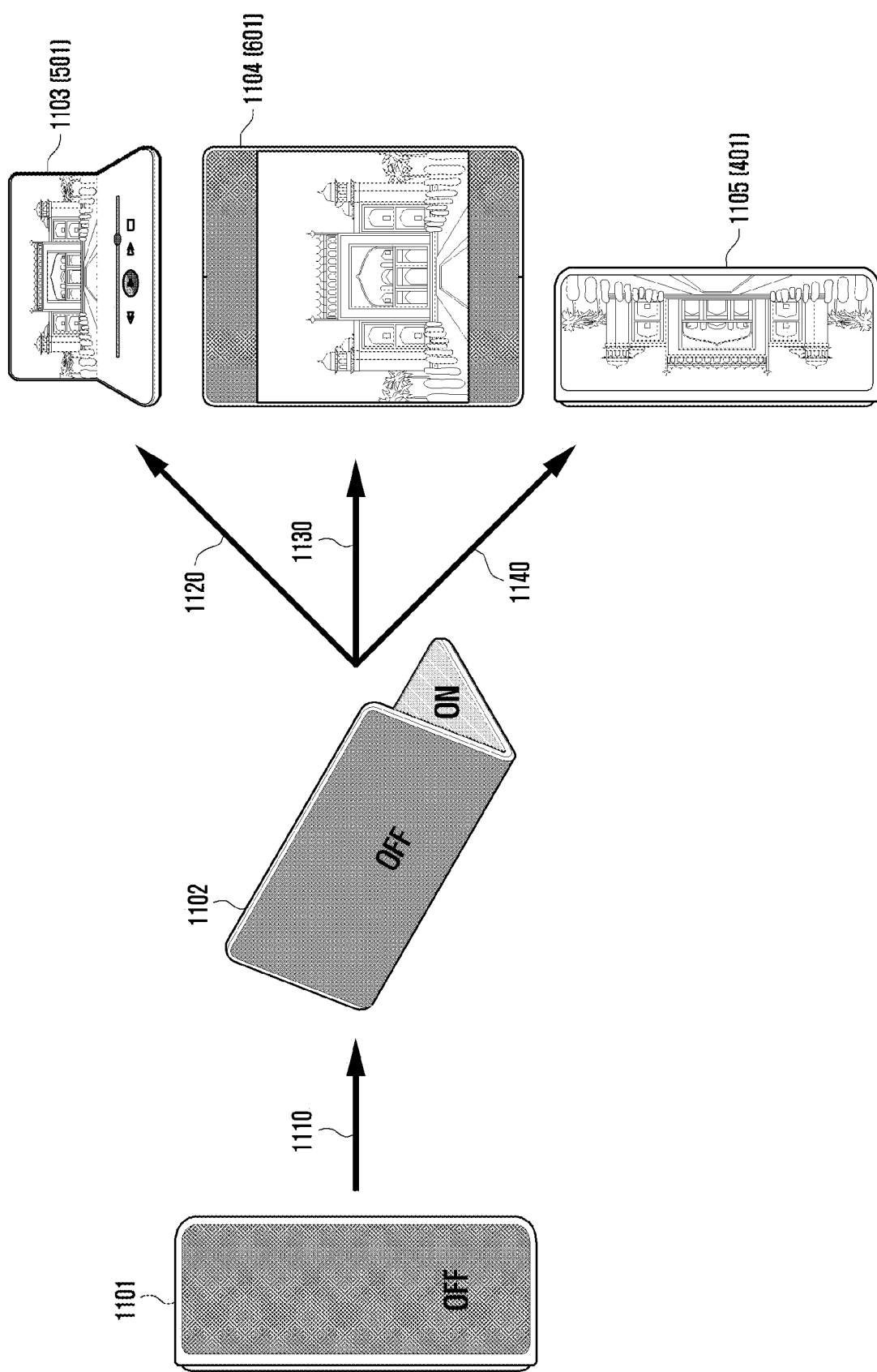
FIG. 11 is a diagram illustrating an example scenario for controlling a drive state of a display in case an electronic device switches from a folded state to an unfolded state according to various embodiments.

FIG. 11 is a diagram illustrating an example scenario for controlling a drive state of a display 320 in case an electronic device 200 switches from a folded state to an unfolded state according to various embodiments. Hereinafter, in conjunction with FIG. 9 and FIG. 11, the change of a drive state of the display 320 will be described.

Scenarios 1110, 1120, 1130, and 1140 in FIG. 11 show that the angle (e.g., an unfolding threshold angle) between the first housing 210 and the second housing 220 is changed. For example, the scenarios 1110, 1120, 1130, and 1140 may indicate a state change of the display 320, based on the unfolding threshold angles (UFD1 to UFD3).

In FIG. 11, reference numeral 1101 shows a state of the electronic device 200 in which the display 320 is controlled to an off-state in a folded state between the first housing 210 and the second housing 220.

In FIG. 11, reference numeral 1102 shows a state of the electronic device 200 in which the first display 230 is controlled to an on-state in a state where the angle between the first housing 210 and the second housing 220 is greater than the first unfolding threshold angle UFD1 and is less than or equal to the second unfolding threshold angle UFD2.

In FIG. 11, reference numeral 1103 shows a state of the electronic device 200 in which the display 320 is controlled to a flex state in a state where the angle between the first housing 210 and the second housing 220 is greater than the second unfolding threshold angle UFD2 and is less than or equal to the third unfolding threshold angle UFD3. For example, the state of the electronic device 200 according to the reference numeral 1103 in FIG. 11 may be the same as or similar to the state 501 of the electronic device 200 as illustrated in FIG. 5.

In FIG. 11, reference numeral 1104 shows a state of the electronic device 200 in which the display 320 is controlled to a large screen display state in case the angle between the first housing 210 and the second housing 220 is greater than the third unfolding threshold angle UFD3. For example, the state of the electronic device 200 according to the reference numeral 1104 in FIG. 11 may be the same as or similar to the state 601 of the electronic device 200 as illustrated in FIG. 6.

In FIG. 11, reference numeral 1105 shows a state of the electronic device 200 in which the display 320 is controlled to a cover display state in a folded state between the first housing 210 and the second housing 220. For example, the state of the electronic device 200 according to the reference numeral 1105 in FIG. 11 may be the same as or similar to the state 401 of the electronic device 200 as illustrated in FIG. 4A.

Referring to the scenario 1110 in FIG. 11, as described in operation 941 to operation 942 in FIG. 9, in case it is detected that the angle between the first housing 210 and the second housing 220 exceeds the first unfolding threshold angle UFD1, the electronic device 200 may switch the first display 230 to an on-state, and may maintain the second display 252 in an off-state (or a standby state). For example, the electronic device 200 may control the display 320 to a large screen state in case the angle between the first housing 210 and the second housing 220 exceeds the first unfolding threshold angle UFD1. The electronic device 200 may control to display a designated screen (e.g., a home screen) through the first display 230 or a screen (e.g., a previous execution screen) based on a user setting through the first display 230, in a large screen state.

Referring to the scenario 1120 in FIG. 11, as described in operation 960 in FIG. 9, the electronic device 200 may switch the display 320 to a flex state in case the angle between the first housing 210 and the second housing 220 exceeds the second unfolding threshold angle UFD2. After the display 320 is switched to a flex state, the electronic device 200 may control the display 320 to a flex state until the angle between the first housing 210 and the second housing 220 reaches the third unfolding threshold angle UFD3.

For example, the state of the electronic device 200 indicated by reference numeral 1102 may be a state where the electronic device 200 controls the first display 230 to a large screen state and thus a user interface (not shown) capable of selecting an application is provided. The electronic device 200 may provide an execution screen of a specific application or may execute a specific function, based on a user input through the user interface. In the state of providing an execution screen of a specific application or executing a specific function, the electronic device 200 may switch the display 320 to a flex state and may provide an execution screen of the specific application in the flex state, in case the second unfolding threshold angle UFD2 is exceeded.

Referring to the scenario 1130 in FIG. 11, as described in operation 980 in FIG. 9, the electronic device 200 may switch the display 320 to a large screen state in case the angle between the first housing 210 and the second housing 220 exceeds the third unfolding threshold angle UFD3. According to an embodiment, in a large screen state, the electronic device 200 may display an execution screen of an application through the entire display area of the first display 230. According to an embodiment, in a large screen state, the electronic device 200 may display an execution screen of an application and a user control menu through the entire display area of the first display 230.

Referring to the scenario 1040 in FIG. 11, the electronic device 200 may be controlled to a cover display state in case the first housing 210 and the second housing 220 become a folded state. For example, the electronic device 200 may switch the first display 230 to an off-state and control the second display 252 to an on-state. The electronic device 200 may display at least a part of a screen displayed on the first display 230 through the second display 252. Accordingly, a user may continuously see the screen, which is identified through the first display 230, through the second display 252.

That the electronic device 200 switches to a cover display state as the first housing 210 and second housing 220 become a folded state may be adjusted based on a user setting (e.g., an app continuity setting). In case a user setting (e.g., an app continuity setting) is deactivated, the electronic device 200 may switch the first display 230 to an off-state in response to the first housing 210 and second housing 220 becoming a folded state, and may control such that the second display 252 maintains an off-state (or a standby state).

Figure 12:
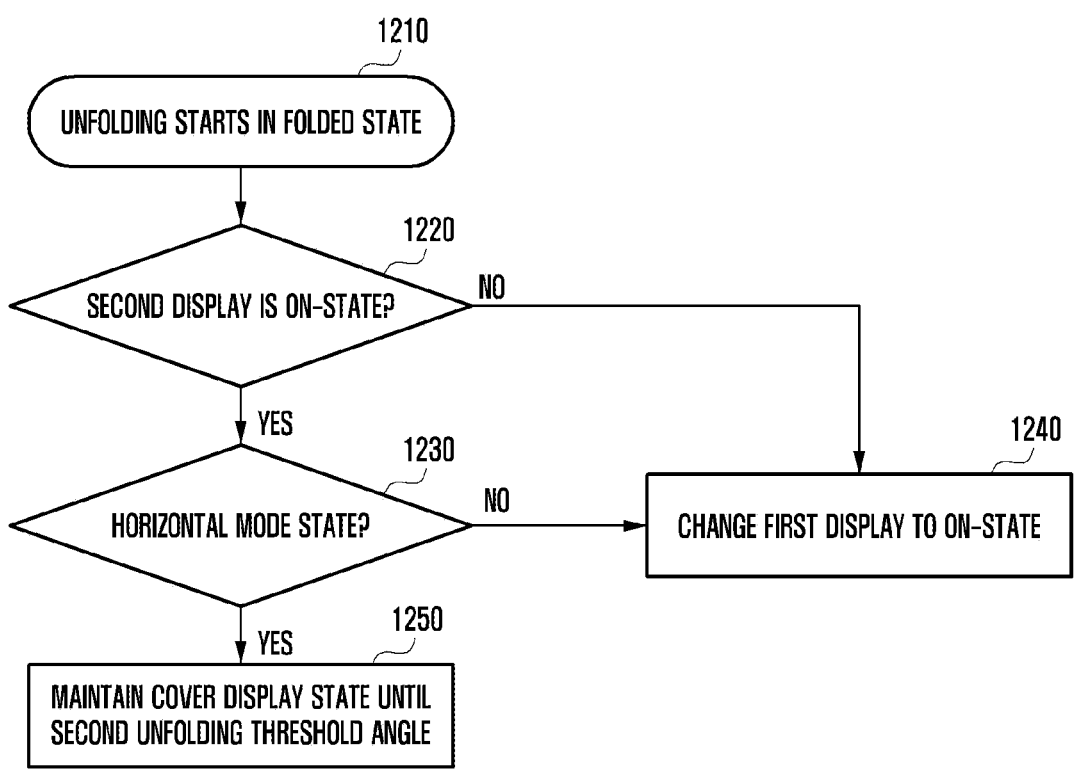
FIG. 12 is a flowchart illustrating an example method for controlling a drive state of a display in case an electronic device changes from a folded state to an unfolded state according to various embodiments.

FIG. 12 is a flowchart illustrating an example method for controlling a drive state of a display 320 in case an electronic device 200 changes from a folded state to an unfolded state according to various embodiments.

At least a part of the operations as illustrated in FIG. 12 may be omitted. At least some operations of the electronic device 200 described with reference to other drawings of the disclosure may be additionally inserted before or after at least some operations as illustrated in FIG. 12.

The operations as illustrated in FIG. 12 may be performed by a processor (e.g., the processor 120 in FIG. 1) of the electronic device 200. For example, a memory (e.g., the memory 130 in FIG. 1) of the electronic device 200 may store instructions which, when executed, cause the processor 120 to perform at least some operations as illustrated in FIG. 12.

In operation 1210, the electronic device 200 may detect that unfolding between the first housing 210 and the second housing 220 starts. The operation 1210 may be the same as or similar to the operation 910 in FIG. 9.

In operation 1220, the electronic device 200 may identify whether the second display 252 is in an on-state in case unfolding starts. The operation 1220 may be the same as or similar to the operation 920 in FIG. 9.

The electronic device 200 may perform operation 1230 in case unfolding starts from a folded state and a second display is in an on-state (e.g., the result of operation 1220 is "YES").

The electronic device 200 may perform operation 1240 in case unfolding starts from an off-state of the first display 320 and an off-state of the second display 252 (or a standby state of the second display 252) (e.g., the result of operation 1220 is "NO").

In operation 1230, the electronic device 200 may identify whether a horizontal mode (e.g., a landscape mode) is activated in the second display 252 in case unfolding starts from a folded state and a second display is in an on-state.

In various embodiments of the disclosure, a horizontal mode may refer, for example, to a state where the display 320 is controlled such that the horizontal direction (e.g., the x-axis direction) of a screen becomes the lengthwise direction of the display 320. For example, the lengthwise direction of the second display 252 as illustrated in FIG. 2A is the y-axis direction. In case the horizontal mode of the second display 252 is activated, the electronic device 200 may control such that the horizontal direction of a screen becomes the y-axis direction of the second display 252.

According to an embodiment, activation of a horizontal mode may be performed based on a user input through the display 320. According to an embodiment, activation of a horizontal mode may include a state where a designated application is executed through the second display 252, and for example, may include a state where a designated application is executed in a cover display mode. For another example, an inactive state of a horizontal mode may include a state where the second display 252 is in an on-state and an execution screen of a designated application is not displayed. For another example, an inactive state of a horizontal mode may include a state where the second display 252 is in an on-state and a designated home screen is displayed. For example, a designated home screen may include at least one execution icon corresponding to at least one application and/or a widget icon associated with at least one application.

The electronic device 200 may perform operation 1250 in case a horizontal mode is activated in the second display 252 (e.g., the result of operation 1230 is "YES").

The electronic device 200 may perform operation 1240 in case a horizontal mode is deactivated in the second display 252 (e.g., the result of operation 1230 is "NO").

In operation 1240, the electronic device 200 may control the second display 252 to an off-state and may control the first display 230 to an on-state according to the angle between the first housing 210 and the second housing 220. For example, in case it is detected that the angle between the first housing 210 and the second housing 220 exceeds the first unfolding threshold angle UFD1, the electronic device 200 may change the first display 230 to an on-state, and may maintain the second display 252 in an off-state (or a standby state). For example, operation 1240 may be the same as or similar to the operation 941 and the operation 942 as illustrated in FIG. 9.

In operation 1250, the electronic device 200 may maintain a cover display state until the angle between the first housing 210 and the second housing 220 reaches the second unfolding threshold angle UFD2. For example, operation 1250 may be the same as or similar to the operation 930 as illustrated in FIG. 9. Although not illustrated, the electronic device 200 may change to a flex state in the same manner as operation 960 in case the angle between the first housing 210 and the second housing 220 reaches the second unfolding threshold angle UFD2, and may change to a large screen state in the same manner as operation 980 in case the angle therebetween reaches the third unfolding threshold angle UFD3.

Figure 13:
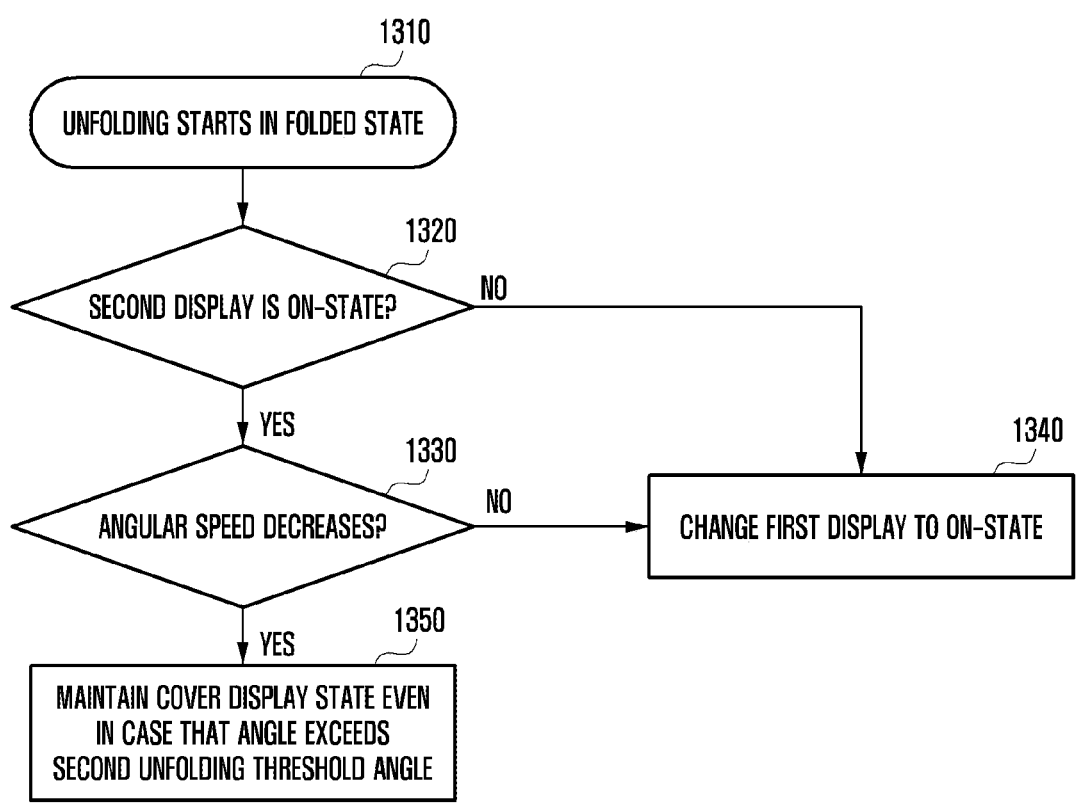
FIG. 13 is a flowchart illustrating an example method for controlling a drive state of a display in case an electronic device changes from a folded state to an unfolded state according to various embodiments.

FIG. 13 is a flowchart illustrating an example method for controlling a drive state of a display 320 in case an electronic device 200 changes from a folded state to an unfolded state according to various embodiments.

At least a part of the operations as illustrated in FIG. 13 may be omitted. At least some operations of the electronic device 200 described with reference to other drawings of the disclosure may be additionally inserted before or after at least some operations as illustrated in FIG. 13.

The operations as illustrated in FIG. 13 may be performed by the processor 120 of the electronic device 200. For example, a memory (e.g., the memory 130 in FIG. 1) of the electronic device 200 may store instructions which, when executed, cause the processor 120 to perform at least some operations as illustrated in FIG. 13.

In operation 1310, the electronic device 200 may detect that unfolding between the first housing 210 and the second housing 220 starts. The operation 1310 may be the same as or similar to the operation 910 in FIG. 9.

In operation 1320, the electronic device 200 may identify whether the second display 252 is in an on-state in case unfolding starts. The operation 1320 may be the same as or similar to the operation 920 in FIG. 9.

The electronic device 200 may perform operation 1330 in case unfolding starts from a folded state and a cover display state (e.g., the result of operation 1320 is "YES").

The electronic device 200 may perform operation 1340 in case unfolding starts from an off-state of the first display 320 and an off-state of the second display 252 (or a standby state of the second display 252) (e.g., the result of operation 1320 is "NO").

In operation 1330, the electronic device 200 may identify whether an angular speed, in which the angle between the first housing 210 and the second housing 220 increases, decreases. For example, that angular speed increases may refer, for example, to the first housing 210 and the second housing 220 being gradually quickly unfolded by a user. For another example, that angular speed decreases may refer, for example, to the first housing 210 and the second housing 220 being gradually slowly unfolded by a user.

The electronic device 200 may perform operation 1350 in case an angular speed, in which the angle between the first housing 210 and the second housing 220 increases, decreases (e.g., the result of operation 1330 is "YES").

The electronic device 200 may perform operation 1340 in case an angular speed, in which the angle between the first housing 210 and the second housing 220 increases, is constant or increases (e.g., the result of operation 1330 is "NO").

In operation 1340, in case it is detected that the angle between the first housing 210 and the second housing 220 exceeds the first unfolding threshold angle UFD1, the electronic device 200 may change the first display 230 to an on-state, and may maintain the second display 252 in an off-state (or a standby state). The electronic device 200 may change the display 320 to a flex state in case the angle between the first housing 210 and the second housing 220 exceeds the second unfolding threshold angle UFD2. The electronic device 200 may be changed to a large display state in case the angle between the first housing 210 and the second housing 220 exceeds the third unfolding threshold angle UFD3.

In operation 1350, in case an angular speed, in which the angle between the first housing 210 and the second housing 220 increases, decreases or is less than or equal to a designated speed, the electronic device 200 may maintain a cover display state even in case the angle between the first housing 210 and the second housing 220 exceeds the second unfolding threshold angle UFD2.

According to an embodiment, in case an angular speed, in which the angle between the first housing 210 and the second housing 220 increases, decreases or is less than or equal to a designated speed, the electronic device 200 may predict that a user wants to maintain the current state (e.g., a cover display state) of the display 320, may predict that the user wants to continuously watch a screen through the second display 252, and thus may maintain the cover display state even in case the angle between the first housing 210 and the second housing 220 exceeds the second unfolding threshold angle UFD2.

In various embodiments, in case an angular speed, in which the angle between the first housing 210 and the second housing 220 increases, decreases, and the angle between the first housing 210 and the second housing 220 exceeds the second unfolding threshold angle UFD2, the electronic device 200 may display a screen change button through at least a portion of the second display 252. In case a user input for selecting a screen change button is received, the electronic device 200 may release the cover display state, and may control the display 320 to a flex state or a large screen state.

According to an embodiment, in case an angular speed, in which the angle between the first housing 210 and the second housing 220 increases, increases or is a designated speed or more, the electronic device 200 may predict that a user wants to change the current state (e.g., a cover display state) of the display 320 to another state (e.g., a flex state or a large screen state) of the display 320.

In various embodiments, the electronic device 200 may change from a cover display state to a flex state or from a cover display state to a large screen state according to the size of the angular speed. For example, in case the size of the angular speed is greater than a reference value (e.g., a scenario in which unfolding is very quickly performed by a user), the electronic device 200 may directly change from a cover display state to a large screen state.

As another example, in case there is no section in which an angular speed, in which the angle between the housings 210 and 220 is within the third unfolding threshold angle UFD3, decreases, the electronic device 200 may be recognized as the entire unfolding operation and thus may directly change from a cover display state to a large screen state. In various embodiments, in case an angular speed, in which the angle between the first housing 210 and the second housing 220 increases, decreases, and the angle between the first housing 210 and the second housing 220 exceeds the second unfolding threshold angle UFD2, the electronic device 200 may display a screen change button through at least a portion of the second display 252. In case a user input for selecting a screen change button is received, the electronic device 200 may release a cover display state, and may control the display 320 to a flex state or a large screen state according to the angle between the first housing 210 and the second housing 220. For example, in case the angle between the first housing 210 and the second housing 220 is greater than the second unfolding threshold angle UFD2 and is less than or equal to the third unfolding threshold angle UFD3, the electronic device 200 may change the display 320 to a flex state in response to a user input for selecting a screen change button. For example, in cast that the angle between the first housing 210 and the second housing 220 is greater than the third unfolding threshold angle UFD3, the electronic device 200 may change the display 320 to a large screen state in response to a user input for selecting a screen change button.

Figure 14:
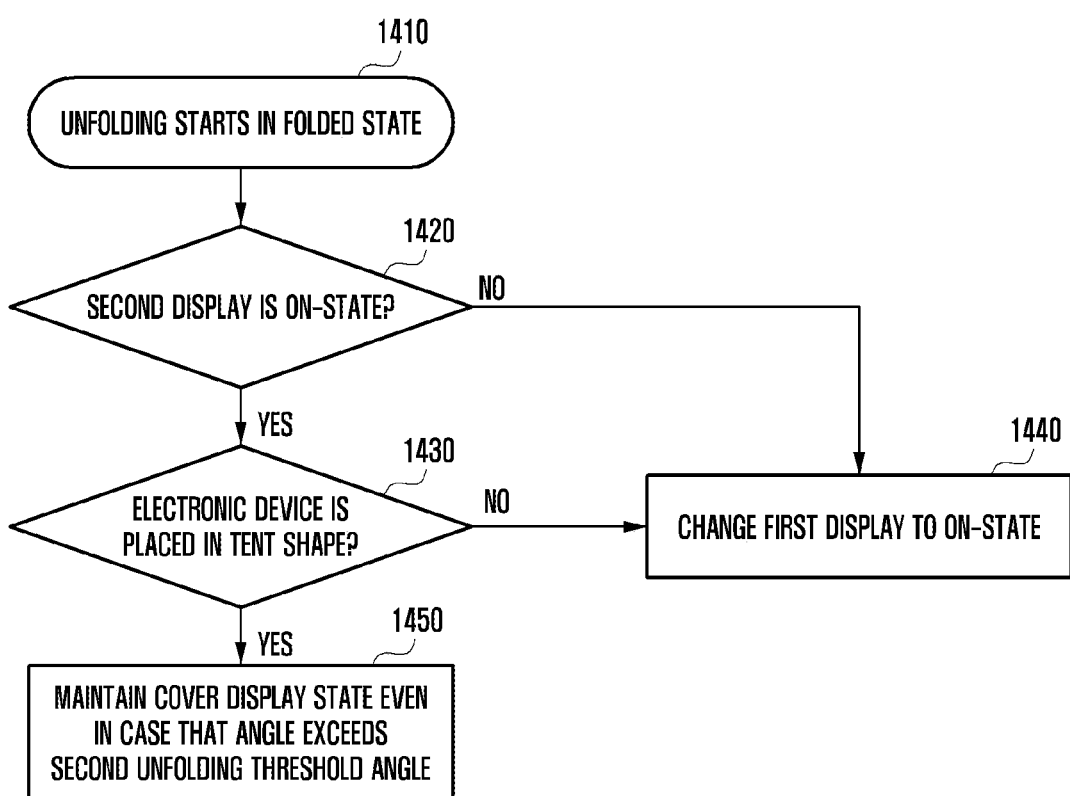
FIG. 14 is a flowchart illustrating an example method for controlling a drive state of a display in case an electronic device changes from a folded state to an unfolded state according to various embodiments.

FIG. 14 is a flowchart illustrating an example method for controlling a drive state of a display 320 in case an electronic device 200 changes from a folded state to an unfolded state according to various embodiments.

At least a part of the operations as illustrated in FIG. 14 may be omitted. At least some operations of the electronic device 200 described with reference to other drawings of the disclosure may be additionally inserted before or after at least some operations as illustrated in FIG. 14.

The operations as illustrated in FIG. 14 may be performed by a processor 120 of the electronic device 200. For example, a memory (e.g., the memory 130 in FIG. 1) of the electronic device 200 may store instructions which, when executed, cause the processor 120 to perform at least some operations as illustrated in FIG. 14.

In operation 1410, the electronic device 200 may detect that unfolding between the first housing 210 and the second housing 220 starts. The operation 1410 may be the same as or similar to the operation 910 in FIG. 9.

In operation 1420, the electronic device 200 may identify whether the second display 252 is in an on-state in case unfolding starts. The operation 1420 may be the same as or similar to the operation 920 in FIG. 9.

The electronic device 200 may perform operation 1430 in case unfolding starts from a folded state and a cover display state (e.g., the result of operation 1420 is "YES").

The electronic device 200 may perform operation 1440 in case unfolding starts from an off-state of the first display 320 and an off-state of the second display 252 (or a standby state of the second display 252) (e.g., the result of operation 1420 is "NO").

In operation 1430, the electronic device 200 may identify whether the electronic device 200 is placed in a tent shape. For example, as illustrated in FIG. 4C, that the electronic device 200 is placed in a tent shape may refer, for example, to a state where the electronic device 200 is an intermediate state, and a side surface (e.g., the first side surface 213a in FIG. 2A) of the first housing 210 and a side surface (e.g., the fourth side surface 223a in FIG. 2A) of the second housing 220 are placed on a floor. The electronic device 200 being placed in a tent shape may refer, for example, to a state where a part of a side surface (e.g., the first side surface 213a in FIG. 2A) of the first housing 210 and a part of a side surface (e.g., the fourth side surface 223a in FIG. 2A) of the second housing 220 are placed to be oriented in the direction of gravity G.

According to an embodiment, in the state where the electronic device 200 is placed in a tent shape, the display 320 may operate in a cover display state.

In case the electronic device 200 is placed in a tent shape (e.g., the result of operation 1430 is "YES"), the electronic device 200 may perform operation 1450.

In case the electronic device 200 is not placed in a tent shape (e.g., as illustrated in FIG. 4B, a state where a surface (e.g., the fourth surface in FIG. 2A) between the first housing 210 and the second housing 220 is placed in the direction of gravity G, and the result of operation 1430 is "NO"), the electronic device 200 may perform operation 1440.

In operation 1440, in case the electronic device 200 is not placed in a tent shape, the electronic device 200 may change a drive state of the display 320, based on the angle between the first housing 210 and the second housing 220. For example, in case it is detected that the angle between the first housing 210 and the second housing 220 exceeds the first unfolding threshold angle UFD1, the electronic device 200 may change the first display 230 to an on-state, and may maintain the second display 252 in an off-state (or a standby state). The electronic device 200 may change the display 320 to a flex state in case the angle between the first housing 210 and the second housing 220 exceeds the second unfolding threshold angle UFD2. The electronic device 200 may change to a large display state in case the angle between the first housing 210 and the second housing 220 exceeds the third unfolding threshold angle UFD3.

In operation 1450, in case the electronic device 200 is placed in a tent shape, the electronic device 200 may maintain a cover display state even in case the angle between the first housing 210 and the second housing 220 exceeds the second unfolding threshold angle UFD2.

According to an embodiment, in case the electronic device 200 is placed in a tent shape, the electronic device 200 may predict that a user wants to continuously watch a screen through the second display 252, and thus may maintain the cover display state even in case the angle between the first housing 210 and the second housing 220 exceeds the second unfolding threshold angle UFD2.

In various embodiments, in case the electronic device 200 is placed in a tent shape, and the angle between the first housing 210 and the second housing 220 exceeds the second unfolding threshold angle UFD2, the electronic device 200 may display a screen change button through at least a portion of the second display 252. In case a user input for selecting a screen change button is received, the electronic device 200 may release the cover display state, and may control the display 320 to a flex state or a large screen state according to the angle between the first housing 210 and the second housing 220. For example, in case the angle between the first housing 210 and the second housing 220 is greater than the second unfolding threshold angle UFD2 and is less than or equal to the third unfolding threshold angle UFD3, the electronic device 200 may change the display 320 to a flex state in response to a user input for selecting a screen change button. For example, in case the angle between the first housing 210 and the second housing 220 is greater than the third unfolding threshold angle UFD3, the electronic device 200 may change the display 320 to a large screen state in response to a user input for selecting a screen change button.

According to an embodiment, in case unfolding is detected in an on-state of the second display 252, the electronic device 200 may control the display 320, based on the angle between the first housing 210 and the second housing 220 and the state where the electronic device 200 is placed. In case it is detected that the angle between the first housing 210 and the second housing 220 in an on-state of the second display 252 is equal to or greater than the second unfolding threshold angle UFD2, the electronic device 200 may determine whether the electronic device 200 is placed in a tent shape. For example, in case the angle between the first housing 210 and the second housing 220 is equal to or greater than the second unfolding threshold angle UFD2 and the electronic device 200 is placed in a tent shape, the cover display state may be maintained. For another example, in case the angle between the first housing 210 and the second housing 220 is equal to or greater than the second unfolding threshold angle UFD2 and the electronic device 200 is not placed in a tent shape, the display 320 may change to a flex state.

Figure 15:
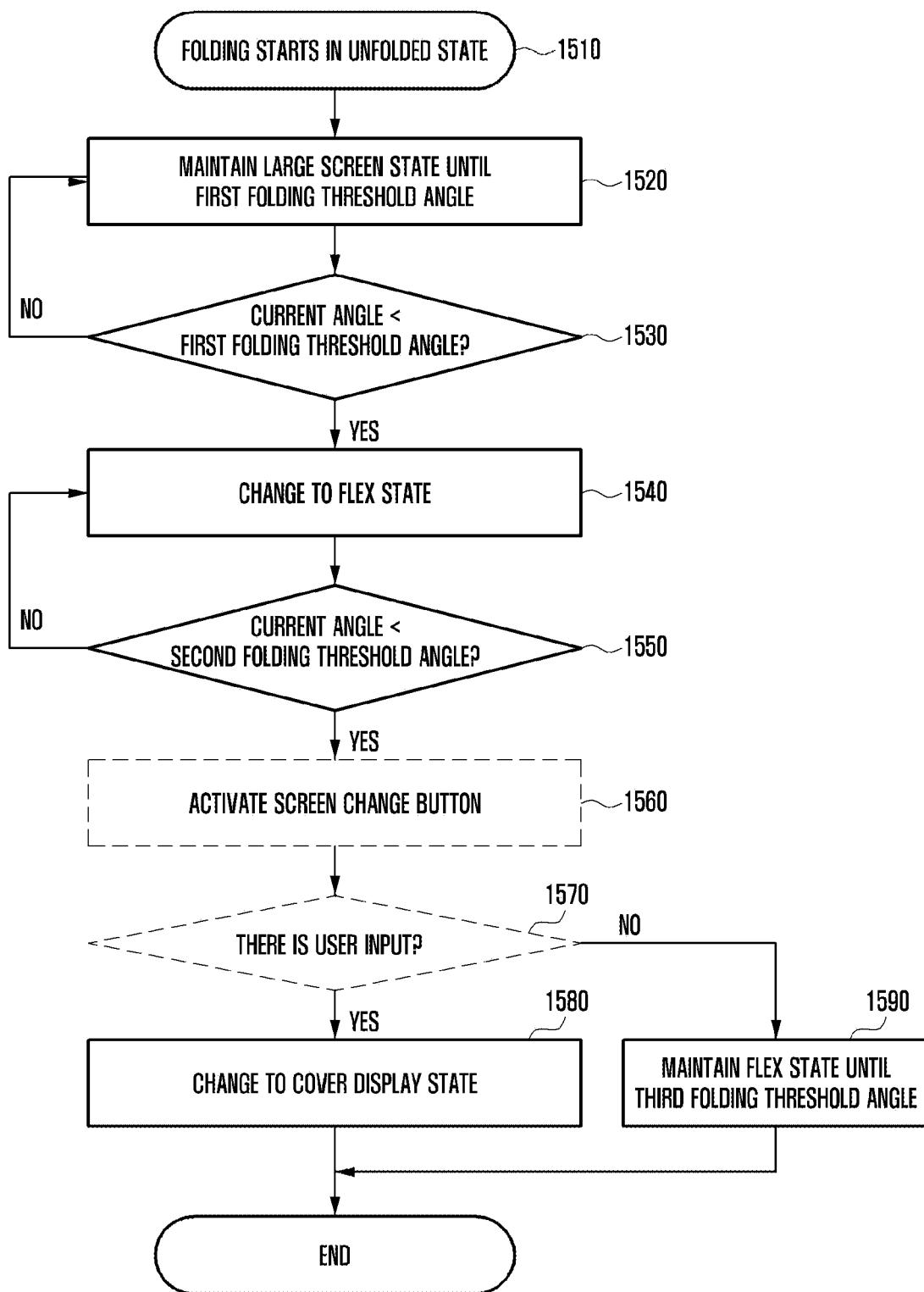
FIG. 15 is a flowchart illustrating an example method for controlling a drive state of a display in case an electronic device changes from an unfolded state to a folded state according to various embodiments.

FIG. 15 is a flowchart illustrating an example method for controlling a drive state of a display 320 in case an electronic device 200 changes from an unfolded state to a folded state according to various embodiments.

At least a part of the operations as illustrated in FIG. 15 may be omitted. At least some operations of the electronic device 200 described with reference to other drawings of the disclosure may be additionally inserted before or after at least some operations as illustrated in FIG. 15.

The operations as illustrated in FIG. 15 may be performed by the processor 120 of the electronic device 200. For example, a memory (e.g., the memory 130 in FIG. 1) of the electronic device 200 may store instructions which, when executed, cause the processor 120 to perform at least some operations as illustrated in FIG. 15.

Referring to FIG. 15, in case folding starts, the electronic device 200 may calculate a range to which the angle between the first housing 210 and the second housing 220 corresponds, based on a first folding threshold angle (e.g., the first folding threshold angle FD1 in FIG. 19), a second folding threshold angle (e.g., the second folding threshold angle FD2 in FIG. 19), and/or a third folding threshold angle (e.g., the third folding threshold angle FD3 in FIG. 19), and may control a drive state of the display 320 according to the range corresponding to the angle between the first housing 210 and the second housing 220.

For example, the first folding threshold angle FD1 may be an obtuse angle and may be a threshold angle for changing a state of the display 320 from a large screen state to a flex state. For example, in case the angle between the first housing 210 and the second housing 220 is less than the first folding threshold angle FD1 during a large screen display state, the electronic device 200 may control the display 320 to a flex state. For example, in case the angle between the first housing 210 and the second housing 220 is greater than or equal to the first folding threshold angle FD1, the electronic device 200 may maintain a large screen state.

For example, the second folding threshold angle FD2 may be an acute angle smaller than the first folding threshold angle FD1, and may be a threshold angle for changing a state of the display 320 from a flex state to a cover display state. For example, in case the angle between the first housing 210 and the second housing 220 is less than the second folding threshold angle FD2 during a flex state, the electronic device 200 may control the display 320 to a cover display state. For example, in case the angle between the first housing 210 and the second housing 220 is less than the first folding threshold angle FD1 and is greater than or equal to the second folding threshold angle FD2, the electronic device 200 may maintain a flex state.

For example, the third folding threshold angle FD3 may be an acute angle smaller than the second folding threshold angle FD2, and may be a threshold angle for changing the display 320 from a cover display state to an off-state of the first display 230 and an off-state of the second display 252 (or a standby state of the second display 252). For example, in case it is detected that the angle between the first housing 210 and the second housing 220 is less than the third folding threshold angle FD3 during a cover display state, the electronic device 200 may control the first display 230 to an off-state and the second display 252 to an off-state. For example, in case the angle between the first housing 210 and the second housing 220 is less than the second folding threshold angle FD2 and is greater than or equal to the third folding threshold angle FD3, the electronic device 200 may maintain a cover display state.

According to various embodiments, the third folding threshold angle FD3 may be omitted according to a user setting (e.g., an app continuity setting). For example, in case a user setting (e.g., an app continuity setting) is activated, the electronic device 200 may maintain a cover display state even in case a folded state, in which the angle between the first housing 210 and the second housing 220 is 0 degrees, becomes.

In operation 1510, the electronic device 200 may detect that folding between the first housing 210 and the second housing 220 starts. For example, in case the first housing 210 and the second housing 220 is in an unfolded state and the display 320 is in a large screen state, the electronic device 200 may detect that the change to an intermediate state is started. The electronic device 200 may detect that folding of the electronic device 200 starts through a sensor module.

In operation 1520, in case a folding starts from an unfolded state between the first housing 210 and the second housing 220 and a large screen state of the display 320, the electronic device 200 may maintain a large screen state until the angle between the first housing 210 and the second housing 220 becomes less than the first folding threshold angle FD1.

In operation 1530, the electronic device 200 may identify whether the angle between the first housing 210 and the second housing 220 is less than the first folding threshold angle FD1.

In case the angle between the first housing 210 and the second housing 220 is less than the first folding threshold angle FD1 (e.g., the result of operation 1530 is "YES"), the electronic device 200 may perform operation 1540.

In case the angle between the first housing 210 and the second housing 220 is greater than or equal to the first folding threshold angle FD1 (e.g., the result of operation 1530 is "YES"), the electronic device 200 may perform operation 1520 again.

In operation 1540, in case the angle between the first housing 210 and the second housing 220 is less than the first folding threshold angle FD1, the electronic device 200 may change the display 320 to a flex state. For example, the electronic device 200 may change the display 320 from a large screen state to a flex state, based on it being detected that the angle between the first housing 210 and the second housing 220 becomes less than the first folding threshold angle FD1.

In a flex state of the display 320, the electronic device 200 may control to detect a direction in which the electronic device 200 is placed, and may control such that the entirety or at least a part of a screen displayed on the first display 230 in a large screen state is displayed in the first area 231a or the second area 231b of the display 320 according to the direction in which the electronic device 200 is placed.

For example, a flex state of the display 320 may be driven in a state where the first housing 210 is placed on a floor surface (e.g., in the direction of gravity G) and the second housing 220 forms a specific angle with respect to the first housing 210. In this case, the second surface of the first housing 210 may be placed to be oriented in the direction of gravity G. In case the first housing 210 is placed on a floor or surface and the second housing 220 forms a specific angle with respect to first housing 210, the electronic device 200 may display the entirety or at least a part of a screen displayed on the first display 230 in a large screen state through the second area 231b of the first display 230 positioned in the second housing 220, and may display a control menu for controlling the screen through the first area 231a of the first display 230 positioned in the first housing 210.

For example, a flex state of the display 320 may be driven in a state where the second housing 220 is placed on a floor surface and the first housing 210 forms a specific angle with respect to the second housing 220. In this case, the fourth surface of the second housing 220 may be placed to be oriented in the direction of gravity G. In case the second housing 220 is placed on a floor surface and the first housing 210 forms a specific angle with respect to second housing 220, the electronic device 200 may display the entirety or at least a part of a screen displayed on the first display 230 in a large screen state through the first area 231a of the first display 230 positioned in the first housing 210, and may display a control menu (e.g., the control menu 512 in FIG. 5) for controlling the screen through the second area 231b of the first display 230 positioned in the second housing 220.

In operation 1550, the electronic device 200 may identify whether the angle between the first housing 210 and the second housing 220 is less than the second folding threshold angle FD2.

In case the angle between the first housing 210 and the second housing 220 is less than the second folding threshold angle FD2 (e.g., the result of operation 1550 is "YES"), the electronic device 200 may perform operation 1560.

In case the angle between the first housing 210 and the second housing 220 is greater than or equal to the first folding threshold angle FD1 (e.g., the result of operation 1550 is "YES"), the electronic device 200 may perform operation 1540 again. For example, the electronic device 200 may maintain a flex state.

In operation 1560, in case the angle between the first housing 210 and the second housing 220 is less than the second folding threshold angle FD2, the electronic device 200 may display a screen change button through at least a portion of the first display 230. For example, the screen change button may be a command button for allowing the electronic device 200 to release a flex state and to control the display 320 to a cover display state.

In operation 1570, the electronic device 200 may identify whether a user input for the screen change button is received.

In case the user input is received (e.g., the result of operation 1570 is "YES"), the electronic device 200 may perform operation 1580.

In case the user input is not received (e.g., the result of operation 1570 is "NO"), the electronic device 200 may perform operation 1590.

In operation 1580, in case a user input for selecting a screen change button is received, the electronic device 200 may release the flex state, and may control the display 320 to a cover display state. For example, in response to the user input, the electronic device 200 may control the first display 230 to an off-state, control the second display 252 to an on-state, and display the entirety or at least a part of a screen displayed on the first display 230 in a large screen state through the second display 252.

In operation 1590, in case the user input is not received (e.g., the result of operation 1570 is "NO"), the electronic device 200 may maintain the flex state of the display 320 until the angle between the first housing 210 and the second housing 220 becomes less than the third folding threshold angle FD3. Although not illustrated, according to an embodiment, in case the angle between the first housing 210 and the second housing 220 becomes less than the third folding threshold angle FD3, the electronic device 200 may control the first display 230 to an off-state. In case the first display 230 becomes an off-state, the electronic device 200 may change to the cover display state according to a user setting (e.g., an app continuity setting). For example, in case a user setting (e.g., an app continuity setting) is activated, the electronic device 200 may change to a cover display state in case the angle between the first housing 210 and the second housing 220 becomes less than the third folding threshold angle FD3 or in case of becoming a folded state. For another example, in case a user setting (e.g., an app continuity setting) is deactivated, the electronic device 200 may change the first display 230 and the second display 252 to an off-state in case the angle between the first housing 210 and the second housing 220 becomes less than the third folding threshold angle FD3 or in case of becoming a folded state.

According to various embodiments, operation 1560 and operation 1570 may be omitted. For example, in operation 1550, in case it is detected that the angle between the first housing 210 and the second housing 220 is less than the second folding threshold angle FD2 in the flex state (e.g., the result of operation 1550 is "YES"), the electronic device 200 may perform operation 1580.

Figure 16:
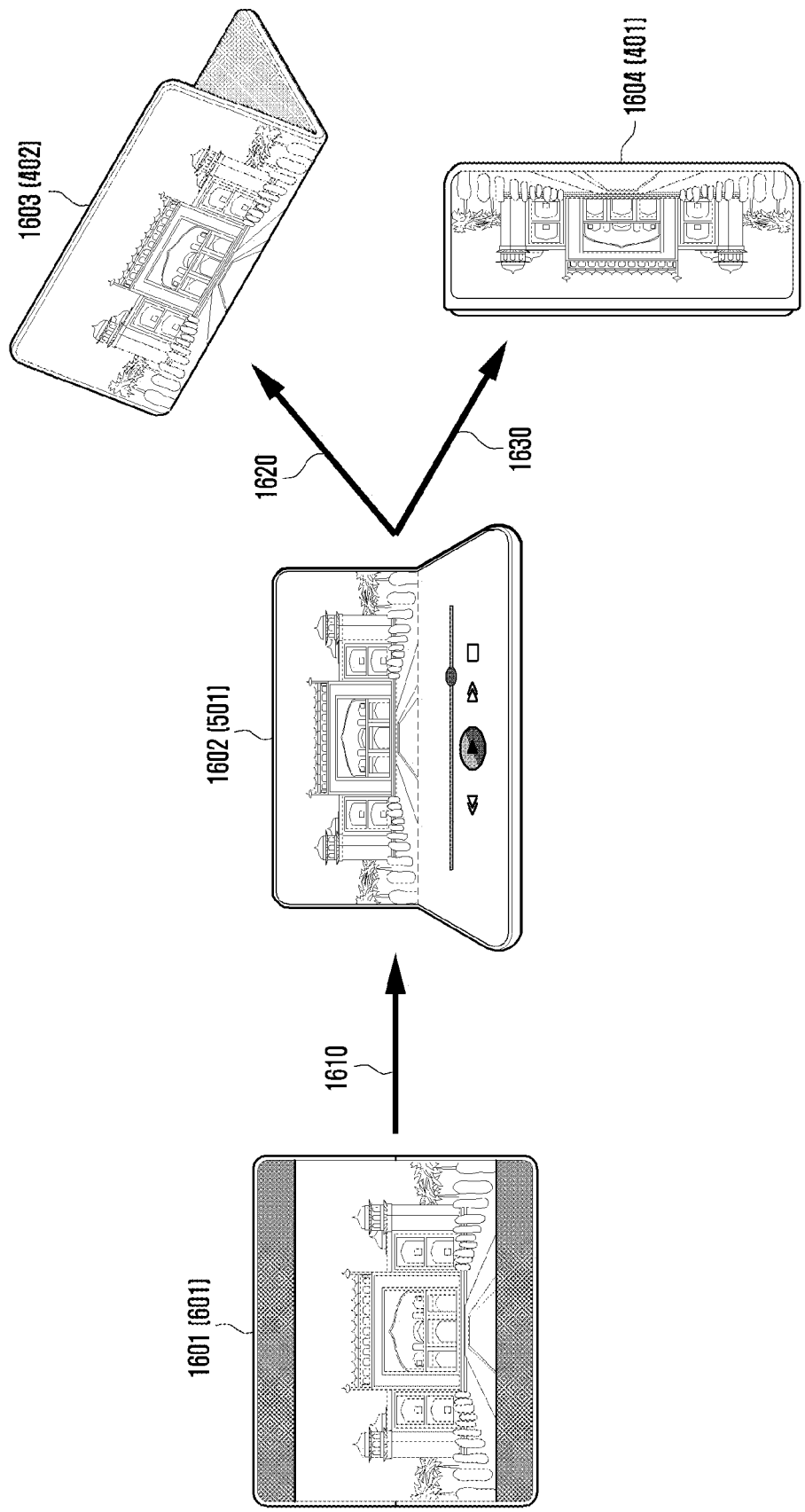
FIG. 16 is a diagram illustrating an example scenario for controlling a drive state of a display in case an electronic device switches from an unfolded state to a folded state according to various embodiments.
Figure 17:
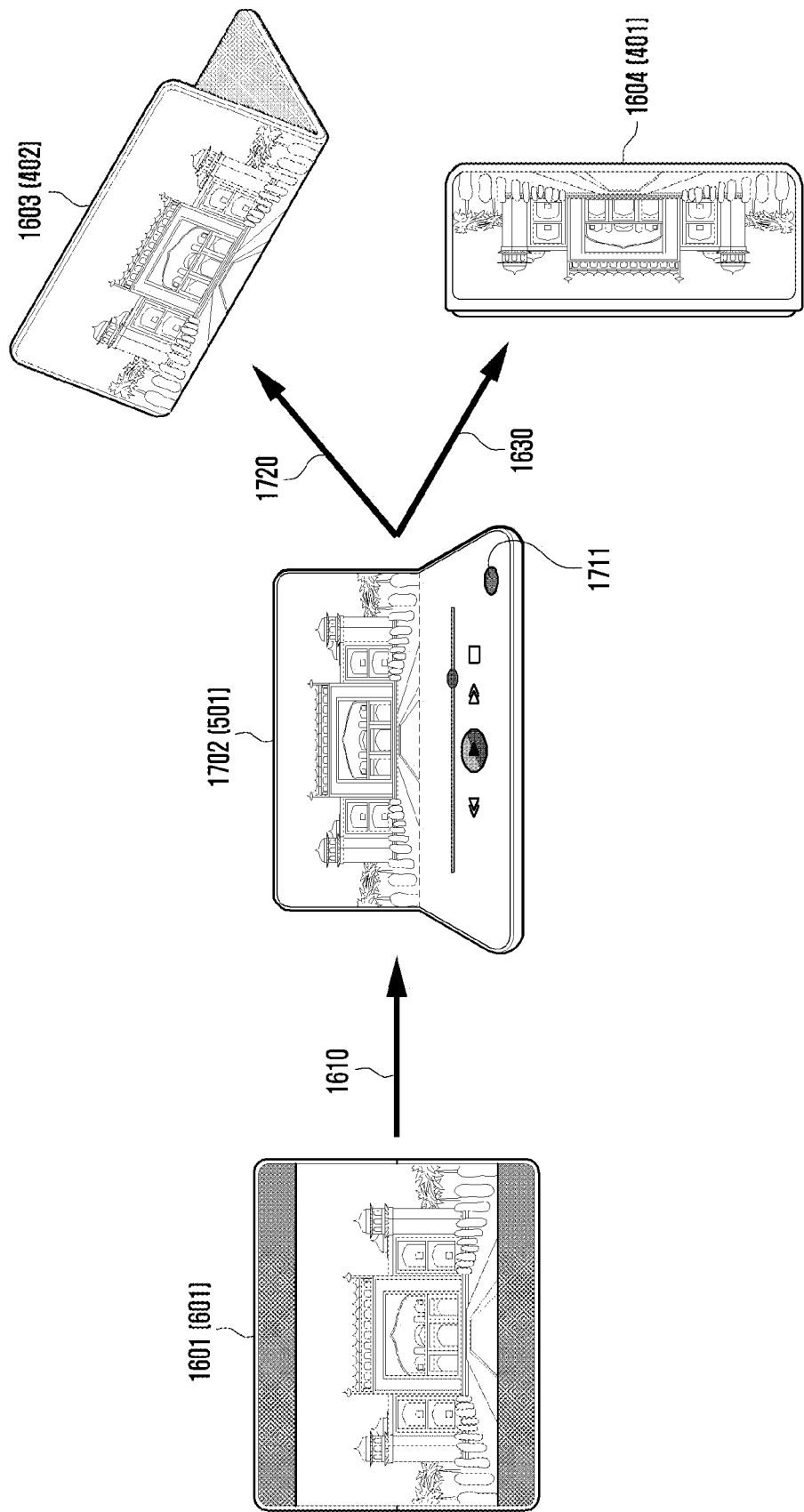
FIG. 17 is a diagram illustrating an example scenario for controlling a drive state of a display in case an electronic device switches from an unfolded state to a folded state according to various embodiments.

FIG. 16 is a diagram illustrating an example scenario for controlling a drive state of a display 320 in case an electronic device 200 switches from an unfolded state to a folded state according to various embodiments. FIG. 17 is a diagram illustrating an example scenario for controlling a drive state of a display 320 in case an electronic device 200 switches from an unfolded state to a folded state according to various embodiments.

Scenarios 1610, 1620, 1630, and 1720 in FIG. 16 and FIG. 17 show that the angle (e.g., a folding threshold angle) between the first housing 210 and the second housing 220 is changed. For example, the scenarios 1610, 1620, 1630, and 1720 may indicate a state change of the display 320, based on the folding threshold angles (FD1 to FD2).

Hereinafter, in conjunction with FIG. 15 to FIG. 17, the change of a drive state of the display 320 will be described.

In FIG. 16 and FIG. 17, reference numeral 1601 shows a state of the electronic device 200 in which the display 320 is controlled to a large screen state in an unfolded state between the first housing 210 and the second housing 220. For example, the state of the electronic device 200 according to the reference numeral 1601 in FIG. 16 and FIG. 17 may be the same as or similar to the state 601 of the electronic device 200 as illustrated in FIG. 6.

In FIG. 16, reference numeral 1602 shows a state of the electronic device 200 in which the display 320 is controlled to a flex state in a state where the angle between the first housing 210 and the second housing 220 is smaller than the first folding threshold angle FD1 and is greater than or equal to the second folding threshold angle FD2. For example, the state of the electronic device 200 according to the reference numeral 1602 in FIG. 16 may be the same as or similar to the state 501 of the electronic device 200 as illustrated in FIG. 5.

FIG. 16 and FIG. 17, reference numeral 1603 shows a state of the electronic device 200 in which the display 320 is controlled to a cover display state in a state where the angle between the first housing 210 and the second housing 220 is less than the second folding threshold angle FD2. For example, the state of the electronic device 200 according to the reference numeral 1603 in FIG. 16 and FIG. 17 may be the same as or similar to the state 402 of the electronic device 200 as illustrated in FIG. 4B.

In FIG. 16 and FIG. 17, reference numeral 1604 show a state of the electronic device 200 in which the display 320 is controlled to a cover display state in a folded state. For example, the state of the electronic device 200 according to the reference numeral 1604 in FIG. 16 and FIG. 17 may be the same as or similar to the state 401 of the electronic device 200 as illustrated in FIG. 4A.

In FIG. 17, reference numeral 1702 shows a state of the electronic device 200 in which the display 320 is controlled to a flex state and a screen change button 1711 is provided in a state where the angle between the first housing 210 and the second housing 220 is smaller than the first folding threshold angle FD1 and is greater than or equal to the second folding threshold angle FD2. For example, the state of the electronic device 200 according to the reference numeral 1702 in FIG. 17 may be the same as or similar to the state 501 of the electronic device 200 as illustrated in FIG. 5.

FIG. 17 is different from FIG. 16 in that scenario 1720 instead of scenario 1620 is included therein, and the others are substantially the same as FIG. 16. Hereinafter, it will be described based on the scenarios in FIG. 16, and descriptions of scenarios overlapping with FIG. 16 in FIG. 17 will be omitted.

Referring to the scenario 1610 in FIG. 16, as described in operation 1540 in FIG. 15, the electronic device 200 may switch the display 320 from a large screen state to a flex state, based on detecting that the angle between the first housing 210 and the second housing 220 is less than the first folding threshold angle FD1.

Referring to scenario 1620 in FIG. 16, as described in operation 1580 in FIG. 15, the electronic device 200 may release a flex state and control the display 320 to a cover display state. The electronic device 200 may display at least a part of a screen displayed on the first display 230 through the second display 252. Accordingly, a user may continuously see the screen, which is identified through the first display 230, through the second display 252. Therefore, a user may continuously see the screen, which is identified through the first display 230, through the second display 252.

Differently from the scenario 1620 in FIG. 16, the electronic device 200 of an embodiment according to the scenario 1720 in FIG. 17 may switch to a cover display state, based on a user input. For example, as described in 1560 and 1570 in FIG. 15, the electronic device 200 may display the screen change button 1711 through at least a portion of the first display 230 in case the angle between the first housing 210 and the second housing 220 is less than the second folding threshold angle FD2, and may control the display 320 to a cover display state in case a user input for the screen change button is received.

Referring to the scenario 1630 in FIG. 16, in case the first housing 210 and the second housing 220 become a folded state, the electronic device 200 may maintain the cover display state.

That the electronic device 200 maintains the cover display state in the folded state between the first housing 210 and second housing 220 may be adjusted based on a user setting (e.g., an app continuity setting). In case a user setting (e.g., an app continuity setting) is deactivated, the electronic device 200 may switch the first display 230 to an off-state in response to the first housing 210 and the second housing 220 becoming a folded state, and may control such that the second display 252 maintains an off-state (or a standby state). In case a user setting (e.g., an app continuity setting) is activated, the electronic device 200 may maintain the cover display state in response to the first housing 210 and the second housing 220 becoming a folded state.

Figure 18:
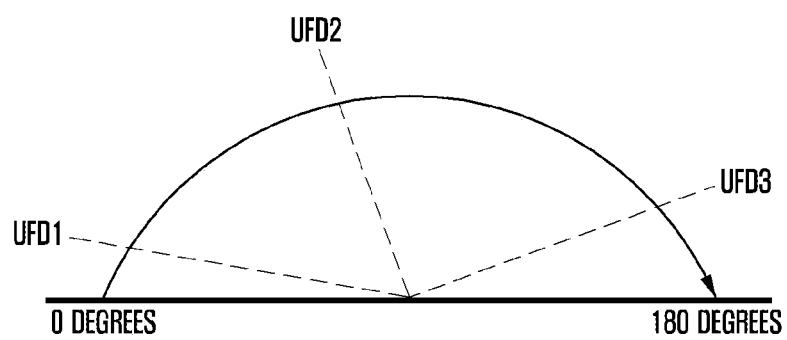
FIG. 18 is a graph illustrating a first unfolding threshold angle to a third unfolding threshold angle for controlling a drive state of a display in case an electronic device switches from a folded state to an unfolded state according to various embodiments.

FIG. 18 is a graph illustrating example first unfolding threshold angle UFD1 to a third unfolding threshold angle UFD3 for controlling a drive state of a display 320 in case an electronic 200 switches from a folded state to an unfolded state according to various embodiments.

Referring to FIG. 18, in case unfolding starts, the electronic device 200 may calculate a range to which the angle between the first housing 210 and the second housing 220 corresponds, based on the first unfolding threshold angle UFD1, the second unfolding threshold angle UFD2, and/or the third unfolding threshold angle UFD3, and may control a drive state of the display 320 according to the range corresponding to the angle between the first housing 210 and the second housing 220.

For example, the first unfolding threshold angle UFD1 may be an acute angle and may be a threshold angle for switching a state of the first display 230 from an off-state to an on-state. For example, the electronic device 200 may switch the first display 230 to an on-state in case the angle between the first housing 210 and the second housing 220 exceeds the first unfolding threshold angle UFD1 while the first display 230 is in an off-state and the second display 252 is in an off-state or a standby state. For example, the electronic device 200 may maintain the first display 230 in an off-state in case the angle between the first housing 210 and the second housing 220 is less than or equal to the first unfolding threshold angle UFD1. According to an embodiment, the first unfolding threshold angle UFD1 may be set as about 10 degrees.

For example, the second unfolding threshold angle UFD2 may be an acute angle greater than the first unfolding threshold angle UFD1, and may be a threshold angle for switching a state of the display 320 from a cover display state to a flex state. For example, the electronic device 200 may maintain the display 320 in a flex state in case the angle between the first housing 210 and the second housing 220 exceeds the second unfolding threshold angle UFD2 during a cover display state. For example, the electronic device 200 may maintain a cover display state in case the angle between the first housing 210 and the second housing 220 exceeds the first unfolding threshold angle UFD1 and is less than or equal to the second unfolding threshold angle UFD2. According to an embodiment, the second unfolding threshold angle UFD2 may be set as about 80 degrees.

For example, the third unfolding threshold angle UFD3 may be an acute angle greater than the second unfolding threshold angle UFD2, and may be a threshold angle for switching a state of the display 320 from a flex state to a large screen state. For example, the electronic device 200 may control the display 320 to a large screen state in case the angle between the first housing 210 and the second housing 220 exceeds the third unfolding threshold angle UFD3 during a flex state. For example, the electronic device 200 may maintain a flex state in case the angle between the first housing 210 and the second housing 220 exceeds the second unfolding threshold angle UFD2 and is less than or equal to the third unfolding threshold angle UFD3. According to an embodiment, the third unfolding threshold angle UFD3 may be set as about 160 degrees.

The first unfolding threshold angle UFD1 to the third unfolding threshold angle UFD3 as illustrated in FIG. 18 may simply be an example, and may be changed according to settings of a manufacturer or a user. For example, the first unfolding threshold angle UFD1 may be set to an angle between 0 degrees and 30 degrees, the second unfolding threshold angle UFD2 may be set to an angle between 70 degrees and 100 degrees, and the third unfolding threshold angle UFD3 may be set to an angle between 145 degrees and 180 degrees.

FIG. 19 is a graph illustrating example first folding threshold angle FD1 to a third folding threshold angle FD3 for controlling a drive state of a display 320 in case an electronic 200 switches from an unfolded state to a folded state according to various embodiments.

Referring to FIG. 19, in case folding starts, the electronic device 200 may calculate a range to which the angle between the first housing 210 and the second housing 220 corresponds, based on the first folding threshold angle FD1, the second folding threshold angle FD2, and/or the third folding threshold angle FD3, and may control a drive state of the display 320 according to the range corresponding to the angle between the first housing 210 and the second housing 220.

For example, the first folding threshold angle FD1 may be an obtuse angle and may be a threshold angle for switching the display 320 from a large screen state to a flex state. For example, in case the angle between the first housing 210 and the second housing 220 is less than the first folding threshold angle FD1 during a large screen display state, the electronic device 200 may control the display 320 to a flex state. For example, in case the angle between the first housing 210 and the second housing 220 is greater than or equal to the first folding threshold angle FD1, the electronic device 200 may maintain a large screen state.

According to an embodiment, the first folding threshold angle FD1 may be set differently from the third unfolding threshold angle UFD3 for switching from a flex state to a large screen state, as illustrated in FIG. 18. For example, the first folding threshold angle FD1 may be set as about 140 degrees. That the electronic device 200 is configured such that the first folding threshold angle FD1 is smaller than the third unfolding threshold angle UFD3 may be in order to make a user, who starts folding in the large screen state, experience the large screen state longer.

For example, the second folding threshold angle FD2 may be an acute angle smaller than the first folding threshold angle FD1, and may be a threshold angle for switching the display 320 from a flex state to a cover display state. For example, in case the angle between the first housing 210 and the second housing 220 is less than the second folding threshold angle FD2 during a flex state, the electronic device 200 may control the display 320 to a cover display state. For example, in case the angle between the first housing 210 and the second housing 220 is less than the first folding threshold angle FD1 and is greater than or equal to the second folding threshold angle FD2, the electronic device 200 may maintain the flex state.

According to an embodiment, the second folding threshold angle FD2 may be set differently from the second unfolding threshold angle UFD2 for switching from a cover display state to a large screen state as illustrated in FIG. 18. For example, the second folding threshold angle FD2 may be set as about 20 degrees. That the electronic device 200 is configured such that the second folding threshold angle FD2 is smaller than the second unfolding threshold angle UFD2 may be to make a user longer watch a screen through the first display 230.

For example, the third folding threshold angle FD3 may be an acute angle smaller than the second folding threshold angle FD2, and may be a threshold angle for switching the display 320 from a cover display state to an off-state of the first display 230 and an off-state of the second display 252 (or a standby state of the second display 252). For example, in case it is detected that the angle between the first housing 210 and the second housing 220 is less than the third folding threshold angle FD3 during a cover display state, the electronic device 200 may control the first display 230 to an off-state and the second display 252 to an off-state. For example, in case the angle between the first housing 210 and the second housing 220 is less than the second folding threshold angle FD2 and is greater than or equal to the third folding threshold angle FD3, the electronic device 200 may maintain the cover display state. According to an embodiment, the third folding threshold angle FD3 may be set equal to or similar to the first unfolding threshold angle UFD1. For example, the third folding threshold angle FD3 may be set as about 10 degrees.

According to various embodiments, the electronic device 200 may further include a fourth folding threshold angle (not shown) set therein for controlling a drive state of the display 320. For example, the fourth folding threshold angle may be an acute angle (e.g., 60 degrees) greater than the second folding threshold angle FD2. For example, the fourth folding threshold angle may be a threshold angle for switching the display 320 from a flex state to a large screen state. For example, in case the angle between the first housing 210 and the second housing 220 is less than the fourth threshold angle FD2 during a flex state, the electronic device 200 may control the display 320 to a large screen state and may display a user control menu through the first display 230. For example, in case the angle between the first housing 210 and the second housing 220 is less than the second folding threshold angle FD2 during a large screen state, the electronic device 200 may switch the display 320 from a large screen state to a cover display state.

According to various embodiments, the third folding threshold angle FD3 may be omitted according to a user setting (e.g., an app continuity setting). For example, in case a user setting (e.g., an app continuity setting) is activated, the electronic device 200 may maintain the cover display state even in case the angle between the first housing 210 and the second housing 220 is smaller than the third folding threshold angle FD3 or in case of becoming a folded state.

The first folding threshold angle FD1 to the third folding threshold angle FD3 as illustrated in FIG. 19 may be an example, and may be changed according to settings of a manufacturer or a user. For example, the first folding threshold angle FD1 may be set to an angle between 170 degrees and 110 degrees, the second unfolding threshold angle UFD2 may be set to an angle between 80 degrees and 10 degrees, and the third unfolding threshold angle UFD3 may be set to an angle between 20 degrees and 0 degrees.

Table 1 may be a summary of various scenarios in which the electronic device 200 according to various embodiments controls a drive state (e.g., a standby state, a cover display state, a flex state, and/or a large screen state) of the display 320 according to the angle between the first housing 210 and the second housing 220 and a state (e.g., whether being folded or unfolded) of the electronic device 200. For example, Table 1 may be a summary of operation scenarios of the electronic device 200 described in connection with FIG. 9 to FIG. 19.

In Table 1, the first row may show a previous state (or a start state) of the electronic device 200, and the first column may show a next state (or an end state) of the electronic device 200.

TABLE 1

|  | Folded state + cover display state (First state) | Unfolded state + large screen state (Second state) | Intermediate state + flex state (Third state) | Intermediate state + cover display state + tent-shaped mounting (Fourth state) | Intermediate state + cover display state + general mounting (Fifth state) |
|---|---|---|---|---|---|
| Folded state + cover display state (First state) | None | Switching to second state in case of exceeding third unfolding threshold angle UFD3 | Switching to third state in case of exceeding second unfolding threshold angle UFD2 | Maintaining fourth state after switching to fourth state (e.g., operation 1450 in FIG. 14) | Maintaining fifth state until reaching second unfolding threshold angle UFD2 |
| Unfolded state + large screen state (Second state) | Turing off display in case of becoming first state or becoming less than third folding threshold angle FD3 | None | Switching to third state in case of becoming less than first folding threshold angle FD1 | Switching to fourth state in case of becoming less than second folding threshold angle FD2. Maintaining fourth state after switching to fourth state (e.g., operation 1450 in FIG. 14) | Switching to fifth state in case of becoming less than second folding threshold angle FD2 |
| Intermediate state + flex state (Third state) | Turning off display in case of becoming first state or exceeding third folding threshold angle FD3 | Switching to second state in case of exceeding third unfolding threshold angle UFD3 | None | Switching to fourth state in case of becoming less than second folding threshold angle FD2. Maintaining fourth state after switching to fourth state (e.g., operation 1450 in FIG. 14) | Switching to fifth state in case of becoming less than second folding threshold angle FD2 |
| Intermediate state + cover display state + tent-shaped mounting (Fourth state) | Turning off display in case of becoming first state or becoming less than third folding threshold angle FD3 | Maintaining fourth state (e.g., operation 1450 in FIG. 14) | Maintaining fourth state (e.g., operation 1450 in FIG. 14) | None | Screen rotation |
| Intermediate state + cover display state + general mounting (Fifth state) | Turning off display in case of becoming first state or becoming less than third folding threshold angle FD3 | Switching to second state in case of exceeding third unfolding threshold angle UFD3 | Switching to third state in case of exceeding second unfolding threshold angle UFD2 | Screen rotation | None |

Figure 20:
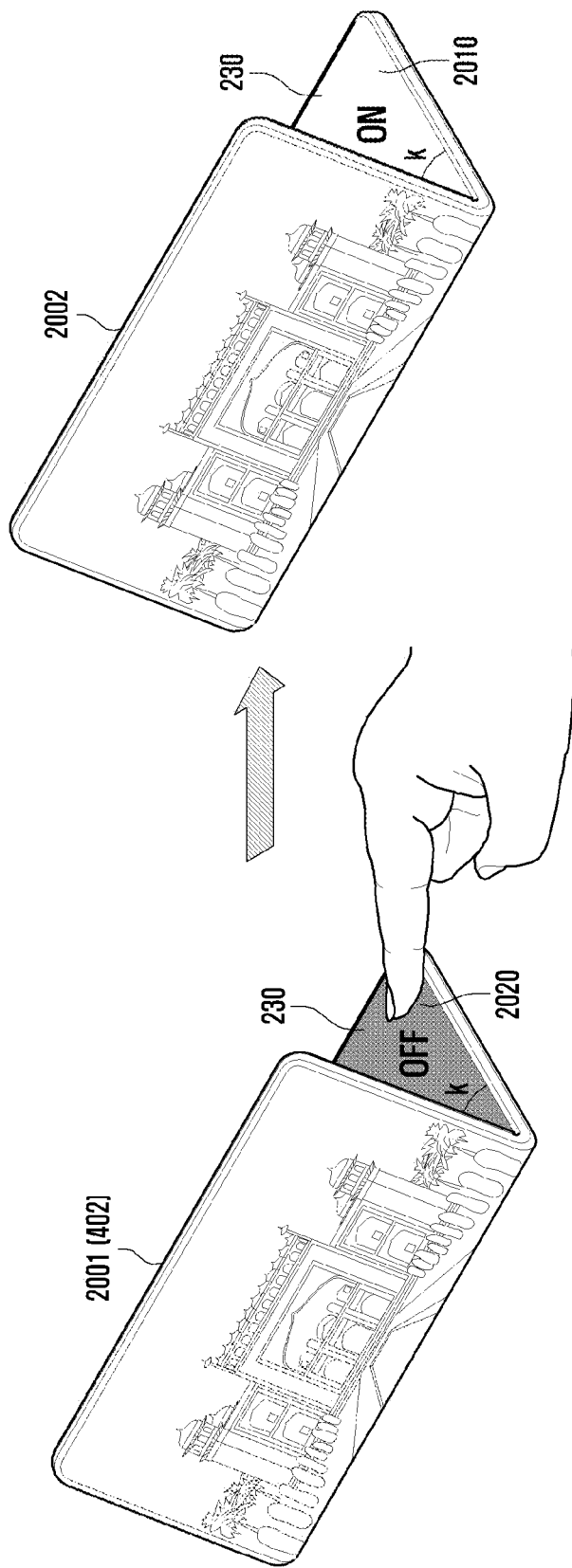
FIG. 20 is a diagram illustrating an example scenario operation in a cover display state of an electronic device according to various embodiments.

FIG. 20 is a diagram illustrating an example scenario operation in a cover display state of an electronic 200 according to various embodiments.

Referring to reference numeral 2001 in FIG. 20, the electronic device 200 (e.g., the electronic device 200 in FIG. 2A and FIG. 2B) according to an embodiment may be in an intermediate state, and may be in a cover display state (e.g., the state 402 of the electronic device 200 in FIG. 4B) of a display.

According to an embodiment, the electronic device 200 may detect a user input 2020 through the first display 230 during a cover display state. As indicated by reference numeral 2002, in case the electronic device detects the user input 2020, the electronic device may display a user interface 2010 associated with a screen provided in a cover display state through the first display 230. For example, the electronic device may reproduce and provide movie content in a cover display state, and may detect the user input 2020 through the first display 230 while reproducing the movie content. The electronic device 200 may switch the first display 230 to an on-state in response to the user input 2020, and may provide a playlist 2010 related to movie content through the first display 230.

In various embodiments, in case a communication event occurs from an external device during a cover display state, the electronic device 200 may control the first display 230 to an on-state, and may display a user interface 2010 including information related to the communication event received through the first display 230.

In various embodiments, in case an application for providing a screen in a cover display state is an application for supporting a flex mode, the electronic device 200 may provide the user interface 2010 corresponding to a flex mode through at least a portion of the first display 230.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a first housing comprising a first surface oriented in a first direction and a second surface oriented in a second direction opposite to the first direction;
   a second housing comprising a third surface oriented in a third direction and a fourth surface oriented in a fourth direction opposite to the third direction;
   a hinge disposed between the first housing and the second housing;
   a first display positioned as visible via the first surface and the third surface;
   a second display positioned as visible via the fourth surface;
   a sensor module, comprising at least one sensor, configured to detect an angle between the first housing and the second housing; and
   a processor operatively connected to the first display, the second display, and the sensor module,
   wherein the processor is configured to:
   detect that unfolding of the electronic device starts based on the electronic device being in a folded state and a screen being displayed on the second display;
   based on the angle between the first housing and the second housing exceeding a first threshold angle during the unfolding of the electronic device: control the second display to an off-state, and control the first display to simultaneously display at least a part of the screen displayed on the second display on a first area of the first display positioned as visible via the first surface and a menu for controlling the screen displayed on the first area on a second area of the first display positioned as visible via the third surface; and
   based on the angle between the first housing and the second housing exceeding a second threshold angle during the unfolding of the electronic device: control the first display to simultaneously display at least a part of the screen displayed on the first area on at least a portion of the first area of the first display and at least a portion of the second area of the first display, wherein the second threshold angle is greater than the first threshold angle.

2. The electronic device of claim 1, wherein the processor is configured to:
   detect that unfolding of the electronic device starts in an off-state of the first display and the second display in the folded state of the electronic device; and
   control the first display to an on-state based on the angle exceeding a third threshold angle less than the first threshold angle.

3. The electronic device of claim 1, wherein the processor is configured to:
   set the first threshold angle to an acute angle; and
   set the second threshold angle to an obtuse angle.

4. The electronic device of claim 1, wherein the processor is configured to detect whether the angle exceeds the first threshold angle based on the screen displayed on the second display being controlled to be displayed in a lengthwise direction of the second display in the folded state.

5. The electronic device of claim 4, wherein the processor is configured to:
   detect whether the angle exceeds a third threshold angle less than the first threshold angle based on the screen not being controlled to be displayed in the lengthwise direction of the second display;
   control the first display to an on-state and control the second display to an off-state based on the angle exceeding the third threshold angle; and
   control the first display to an off-state and control the second display to an off-state based on the angle being less than or equal to the third threshold angle.

6. The electronic device of claim 1, wherein the processor is configured to maintain a state of displaying the screen on the second display based on the angle between the first housing and the second housing exceeding the first threshold angle based on an angular speed, at which the angle changes, decreasing.

7. The electronic device of claim 6, wherein the processor is configured to:
   display a screen change button on the second display based on the angle exceeding the first threshold angle based on an angular speed decreasing; and
   control the second display to the off-state and display at least a part of the screen displayed on the second display on at least a partial area of the first display, based on an input for the screen change button being received.

8. The electronic device of claim 1, wherein the processor is configured to maintain a state where the screen is displayed on the second display based on the angle exceeding the first threshold angle and based on a part of a side surface of the first housing and a part of a side surface of the second housing being placed on a surface.

9. The electronic device of claim 8, wherein the processor is configured to:

display a screen change button on the second display based on the angle exceeding the first threshold angle and based on the screen being displayed on the second display and a part of a side surface of the first housing and a part of a side surface of the second housing being placed on the surface; and control the second display to an off-state and display at least a part of the screen displayed on the second display on at least a partial area of the first display, based on input for the screen change button being received.

10. The electronic device of claim 1, wherein the processor is configured to:

detect that folding of the electronic device starts based on the electronic device being in an unfolded state and the screen being displayed on at least the portion of the first area of the first display and at least the portion of the second area of the first display; and control the first display to display at least a part of the screen displayed on the first area of the first display positioned on the first surface and to display a menu for controlling the screen on a second area of the first display positioned on the third surface, based on the angle being less than a third threshold angle, and wherein the third threshold angle is less than the second threshold angle.

11. The electronic device of claim 1, wherein the processor is configured to:

detect that folding of the electronic device starts based on the electronic device being in an unfolded state and the screen being displayed on at least the portion of the first area of the first display and at least the portion of the second area of the first display; and control the first display to an off-state and to display the screen on the second display, based on the angle being less than a third threshold angle, and wherein the third threshold angle is less than the first threshold angle.

12. The electronic device of claim 1, wherein the processor is configured to:

detect that folding of the electronic device starts based on the electronic device being in an unfolded state and the screen being displayed on at least the portion of the first area of the first display and at least the portion of the second area of the first display;

control the first display to an off-state and display the screen on the second display, based on the angle being less than the second threshold angle and a specified setting being activated; and control the first display and the second display to an off-state based on the angle being less than the second threshold angle and the specified setting being deactivated.

13. A method for driving an electronic device, the electronic device comprising a first housing comprising a first surface oriented in a first direction and a second surface oriented in a second direction opposite to the first direction, a second housing comprising a third surface oriented in a third direction and a fourth surface oriented in a fourth direction opposite to the third direction, a hinge coupled to the first housing and the second housing and to which at least one of the first housing and the second housing is rotatably connected, a first display positioned as visible via the first surface and the third surface, and a second display positioned as visible via the fourth surface, the method comprising:

detecting that unfolding of the electronic device starts based on the electronic device being in a folded state and a screen being displayed on the second display;

based on an angle between the first housing and the second housing exceeding a first threshold angle during the unfolding of the electronic device: controlling the second display to an off-state, simultaneously displaying at least a part of the screen displayed on the second display on a first area of the first display positioned as visible via the first surface and a menu for controlling the screen displayed on the first area on a second area of the first display positioned as visible via the third surface; and based on the angle between the first housing and the second housing exceeding a second threshold angle during the unfolding of the electronic device: simultaneously displaying at least a part of the screen displayed on the first area on at least a portion of the first area of the first display and at least a portion of the second area of the first display, wherein the second threshold angle is greater than the first threshold angle.

14. The method of claim 13, further comprising:

detecting that unfolding of the electronic device starts in an off-state of the first display and the second display in the folded state of the electronic device; and controlling the first display to an on-state based on the angle exceeding a third threshold angle less than the first threshold angle.

15. The method of claim 13, further comprising detecting whether the angle exceeds the first threshold angle based on the screen displayed on the second display being controlled to be displayed in a lengthwise direction of the second display in the folded state of the electronic device.

16. The method of claim 15, further comprising:

detecting whether an angle between the first housing and the second housing exceeds a third threshold angle smaller than the first threshold angle, in case that the screen is not controlled to be displayed in the lengthwise direction of the second display;

controlling the first display to an on-state and controlling the second display to an off-state, in case that the angle between the first housing and the second housing exceeds the third threshold angle; and controlling the first display to an off-state and controlling the second display to an off-state, in case that the angle between the first housing and the second housing is less than or equal to the third threshold angle.

17. The method of claim 13, further comprising maintaining a state of displaying on the screen the second display even in case that the angle between the first housing and the second housing exceeds the first threshold angle, in case that an angular speed, at which the angle between the first housing and the second housing changes, decreases.

18. The method of claim 17, further comprising:

displaying on the screen the second display, and displaying a screen change button on the second display in case that the angle between the first housing and the second housing exceeds the first threshold angle, in a state where an angular speed, at which the angle between the first housing and the second housing increases, decreases; and in case that a user input for the screen change button is received, controlling the second display to an off-state and displaying the screen on at least a partial area of the first display.

19. The method of claim 13, further comprising maintaining a state of displaying on the screen the second display even in case that the angle between the first housing and the second housing exceeds the first threshold angle, in case that a part of a side surface of the first housing and a part of a side surface of the second housing are placed on a floor.

20. The method of claim 19, further comprising:
- displaying on the screen the second display, and displaying a screen change button on the second display in case that the angle between the first housing and the second housing exceeds the first threshold angle, in a state where a part of the side surface of the first housing and a part of the side surface of the second housing are placed on a floor; and
- in case that a user input for the screen change button is received, controlling the second display to an off-state and displaying the screen on at least a partial area of the first display.

\* \* \* \* \*